US012245602B2

(12) United States Patent
Nakamura et al.

(10) Patent No.: US 12,245,602 B2
(45) Date of Patent: Mar. 11, 2025

(54) POULTRY LEG MEAT DEBONING DEVICE AND POULTRY LEG MEAT DEBONING METHOD

(71) Applicant: MAYEKAWA MFG. CO., LTD., Tokyo (JP)

(72) Inventors: Shinya Nakamura, Tokyo (JP); Ken Masubuchi, Tokyo (JP); Kenichi Oka, Tokyo (JP); Kenichiro Sakurai, Tokyo (JP); Noriyuki Inoue, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 18/287,821

(22) PCT Filed: Dec. 16, 2022

(86) PCT No.: PCT/JP2022/046406
§ 371 (c)(1),
(2) Date: Oct. 20, 2023

(87) PCT Pub. No.: WO2023/120419
PCT Pub. Date: Jun. 29, 2023

(65) Prior Publication Data
US 2024/0180177 A1  Jun. 6, 2024

(30) Foreign Application Priority Data

Dec. 20, 2021  (JP) ................. 2021-206463

(51) Int. Cl.
*A22C 21/00* (2006.01)
(52) U.S. Cl.
CPC ...... *A22C 21/0076* (2013.01); *A22C 21/0007* (2013.01)

(58) Field of Classification Search
CPC .................. A22C 21/0076; A22C 21/0007
(Continued)

(56) References Cited

U.S. PATENT DOCUMENTS 5,401,210 A  *  3/1995  Manmoto .......... A22C 21/0076
                                              452/136
5,542,877 A  *  8/1996  Taylor .................. A22C 9/00
                                              452/1

(Continued)

FOREIGN PATENT DOCUMENTS

CN       113543643 A    10/2021
EP        1053684 A1    11/2000

(Continued)

OTHER PUBLICATIONS

Notice of Allowance issued in counterpart Japanese Application No. 2023-522769, mailed Jul. 2, 2024 (6 pages).

(Continued)

*Primary Examiner* — Richard T Price, Jr.
(74) *Attorney, Agent, or Firm* — Osha Bergman Watanabe & Burton LLP

(57) ABSTRACT

A poultry leg meat deboning device is configured to perform a separation of a meat part from a femur with respect to a poultry leg meat to which a peeling off of the meat part has been performed until a side of a knee joint of the femur in a bone-in poultry leg meat which has been cut from a femur of a poultry carcass. The poultry leg meat deboning device includes: an ankle holding part configured to hold an ankle of the poultry leg meat.

13 Claims, 9 Drawing Sheets

(58) Field of Classification Search
USPC .......................................................... 452/135
See application file for complete search history.

(56) References Cited

U.S. PATENT DOCUMENTS

| | | | | |
|---|---|---|---|---|
| 5,961,383 | A | * | 10/1999 | Janssen .............. A22C 21/0076 |
| | | | | 452/136 |
| 8,491,362 | B2 | * | 7/2013 | Kodama ............ A22C 21/0076 |
| | | | | 452/136 |
| 9,795,149 | B2 | * | 10/2017 | Ebbers ............... A22C 21/0076 |
| 2012/0295527 | A1 | | 11/2012 | Hattori et al. |
| 2015/0250193 | A1 | | 9/2015 | Kido et al. |

FOREIGN PATENT DOCUMENTS

| | | |
|---|---|---|
| EP | 3120706 A1 | 1/2017 |
| JP | 2002-010732 A | 1/2002 |
| JP | 4190705 B2 | 12/2008 |
| JP | 4367952 B2 | 11/2009 |
| JP | 2013-507101 A | 3/2013 |
| JP | 2013-255471 A | 12/2013 |
| JP | 5963556 B2 | 8/2016 |
| WO | 2011-121899 A1 | 10/2011 |
| WO | 2012-056793 A1 | 5/2012 |
| WO | 2015-163148 A1 | 10/2015 |
| WO | 2022-043114 A1 | 3/2022 |

OTHER PUBLICATIONS

International Search Report in correspondingn International Application No. PCT/JP2022/046406, dated Feb. 7, 2023 (4 pages).
First Office Action in corresponding Taiwanese Application No. 111148404, dated Aug. 10, 2023 (15 pages).

* cited by examiner

POULTRY LEG MEAT DEBONING DEVICE AND POULTRY LEG MEAT DEBONING METHOD

TECHNICAL FIELD

The present invention relates to a poultry leg meat deboning device and a poultry leg meat deboning method.

Priority is claimed on Japanese Patent Application No. 2021-206463, filed Dec. 20, 2021, the content of which is incorporated herein by reference.

BACKGROUND ART

In the related art, a device (a leg meat separation device; hereinafter referred to as a poultry leg meat deboning device) for automatically deboning bone-in poultry leg meat (hereinafter simply referred to as poultry leg meat) cut from a femur of a poultry carcass is known. After setting the poultry leg meat in the device, the device carries out processes referred to as a plurality of work stations step by step. The plurality of work stations include, in sequence, slit-forming on the poultry leg meat, cutting meat around an ankle of the poultry leg meat, peeling off a meat part until a joint of the poultry leg meat, and cutting the articular muscle and the knee cartilage. Stations after this include peeling off and deboning the meat part from the femur and discharging the remaining bones.

At the station, specifically, the meat part is peeled off until an end portion of the femur on the side of a hip joint (an end portion on the side of femur head). Once the meat part is cut off from the femur at the end portion on the side of the hip joint, deboning of the poultry leg meat is completed. Hereinafter, the end portion of the femur on the side of the hip joint may be simply referred to as the end portion on the side of the femur head.

A plurality of devices corresponding to the stations are provided in the poultry leg meat deboning device. Various devices configured to improve a deboning yield percentage have been proposed as the devices of the stations.

For example, the devices of the stations include an elevatable auxiliary clamp (knee joint vertical gripping portion), a separator (meat separator) constituted by a fixed separator and a movable separator, a leg meat peeling-off ending position detection sensor, and a cutter (muscle disconnection cutter) configured to cut off a femur and a meat part (for example, see Patent Document 1).

This device detects an operation of the movable separator with the leg meat peeling-off ending position detection sensor. It is determined that peeling-off work of the meat part from the femur is terminated at the detected timing. After relative movement between the meat part and the movable separator is stopped, the femur and the meat part are cut off by the cutter.

The devices of the stations include an ankle holding part (clamper), and a grooved Y type introducing guide and a cutter-attached Y type introducing guide, opening ends of which are arranged in a traveling direction of an ankle holding part from an upstream side to a downstream side of a traveling line of the ankle holding part (for example, see Patent Document 2).

In these devices, poultry leg meat is introduced into the opening end of the Y type introducing guide, the poultry leg meat advances in a traveling direction of the ankle holding part, and the end portion and the meat part on the side of the femur head are moved in a direction in which they are pulled away from each other by the Y type introducing guide. After that, the femur and the meat part are cut off by the cutter of the cutter-attached Y type introducing guide.

CITATION LIST

Patent Document

[Patent Document 1]
Japanese Patent No. 4190705
[Patent Document 2]
Japanese Patent No. 4367952

SUMMARY OF INVENTION

Technical Problem

Incidentally, poultry carcass has different sizes of poultry leg meat (bone) depending on the type of chicken, age in days, rearing methods of farms, and the like. However, in the above-mentioned Patent Document 1, a cutting position of the cutter is determined by detecting the operation of the movable separator. For this reason, accuracy of recognizing femur lengths varies. Accordingly, the cutter may cut the end portion on the side of the femur head. This impact could lead to many device failures, such as chipping of cutter edges. It is difficult to adjust an assembly position of a separator or an auxiliary clamp according to the poultry leg meat, and assembly workability is poor.

In the above-mentioned Patent Document 2, it is difficult to properly maintain the posture of the meat part dragged by the guide. For this reason, due to the cutting resistance of the meat part cutter, it is difficult to cut off the femur and meat part at the desired position as the meat part is pushed back in the traveling direction of the ankle holding part. As a result, there was a problem that much retained meat remained on the femur side and the deboning yield percentage decreased.

Here, the present invention provides a poultry leg meat deboning device and a poultry leg meat deboning method that are capable of improving assemblability of the device while suppressing occurrence of device failures, and improving a deboning yield percentage.

Solution to Problem

In order to solve the aforementioned problems, a poultry leg meat deboning device according to the present invention is a poultry leg meat deboning device configured to perform a separation of a meat part from a femur with respect to a poultry leg meat to which a peeling off of the meat part has been performed until a side of a knee joint of the femur in a bone-in poultry leg meat which has been cut from a femur of a poultry carcass, the poultry leg meat deboning device including: an ankle holding part configured to hold an ankle of the poultry leg meat; a leg meat measuring part configured to measure between at least a part of the poultry leg meat closer to the ankle holding part than the knee joint and a cutting part of the poultry leg meat on a side of a hip joint of the poultry leg meat, at a side closer to the femur than the ankle holding part in a state before the peeling off of the meat part of the poultry leg meat has been performed; a separator configured to sandwich the femur from a direction crossing an extension direction of the femur in between the side of the knee joint of the femur and the meat part; a moving part configured to move at least one of the ankle holding part and the separator so that one of the ankle holding part and the separator separates with respect to the other one of the ankle holding part and the separator while maintaining a state in which the separator is sandwiching and configured to relatively move the separator until an end portion of the femur on the side of the hip joint along the femur; a controller configured to determine movement amount of the separator with respect to the femur by the moving part on the basis of a measurement result by the leg meat measuring part; and a cutter configured to cut off the meat part from the femur at the end portion of the femur.

In this way, it is possible to improve accuracy of position recognition at an end portion on the side of the femur head using the leg meat measuring part and the controller. For this reason, it is possible to make the cutter to easily enter while aiming toward a part close to the end portion on the side of the femur head from which the meat part is peeled off by the separator. Here, the cutter can reduce the possibility of cutting the end portion on the side of the femur head. For this reason, it is possible to suppress chipping of the cutter edge and occurrence of failure of the poultry leg meat deboning device. There is no need to adjust an assembly position of the separator depending on the poultry leg meat. For this reason, it is possible to improve assembly workability of the poultry leg meat deboning device. Since the meat part can be cut off from the femur while reducing the remaining meat on the side of the femur, a deboning yield percentage can be improved.

In the configuration, the ankle holding part may hang the poultry leg meat, and the moving part may move the separator downward with respect to the femur.

According to the above-mentioned configuration, a posture of the poultry leg meat can be easily controlled using gravity. The meat part can be easily peeled off the femur by the separator while the posture of the poultry leg meat is maintained.

In the configuration, the moving part may move the separator with respect to the femur by moving only the ankle holding part with respect to the separator.

According to the above-mentioned configuration, since only the ankle holding part is movably configured, the configuration of the poultry leg meat deboning device can be simplified.

In the configuration, an auxiliary clamp configured to hold a root of the femur of the poultry leg meat on the side of the knee joint without changing a relative position with respect to the root may be provided.

According to the above-mentioned configuration, it is possible to prevent the tibia and the femur from being stretched by the peeling-off load of the meat part from the femur by the separator. For this reason, it is possible to prevent the position of the end portion on the side of the femur head from being shifted due to peeling off of the meat part from the femur by the separator.

In the configuration, the controller may move the auxiliary clamp in synchronization with the ankle holding part.

According to the above-mentioned configuration, the load when the meat part is peeled off the femur can be distributed to the ankle holding part and the auxiliary clamp. For this reason, it is possible to prevent the bone from being cut by the load when the meat part is peeled off the femur. Accordingly, the deboning yield percentage can be further improved.

In the configuration, the cutter may be movably held in the direction crossing the extension direction of the femur, and the cutter may move from a side of the femur opposite to a femur head toward the femur head and cuts off the meat part from the femur.

At the end portion on the side of the femur head, the poultry leg meat is attached to the opposite side of the femur head through muscle. For this reason, by moving the cutter from the side opposite to the femur head toward the femur head, the muscle can be cut reliably. That is, for example, when the cutter is moved from the side of femur head toward the opposite side of the femur head, the muscle escapes to the outside, making it difficult to cut the muscle reliably. For this reason, much remaining meat is left on the side of the femur and the deboning yield percentage may be reduced. On the other hand, when the cutter is moved from the opposite side of the femur head toward the femur head, the femur gets in the way and it is possible to prevent the muscle from escaping, and the cutter can reliably cut the muscle. For this reason, the deboning yield percentage can be improved.

In the configuration, the separator may include: a fixed separator; and a movable separator provided to be able to approach and separate from the fixed separator, the movable separator may be provided to be separable from the fixed separator due to a load applied when the movable separator rides on the end portion of the femur, a bone pressing pusher having a pusher main body configured to push the poultry leg meat from a side closer to the fixed separator toward the movable separator may be provided, the pusher main body may be disposed in parallel with the fixed separator on a side of the fixed separator opposite to the ankle holding part, and the bone pressing pusher may push the pusher main body toward the movable separator at a timing when the end portion of the femur is moved to a front surface of the pusher main body.

When the separator is used to peel off the meat part and the separator is moved with respect to the ankle holding part, the separator finally rides on the end portion on the side of the femur head. Here, there was a possibility that the end portion on the side of the femur head might get caught in the separator. For this reason, there was a possibility that the end portion on the side of the femur head would be scraped off by the separator.

Here, by providing the bone pressing pusher, the end portion is separated from the fixed separator just before the separator rides on the end portion on the side of the femur head. Accordingly, the fixed separator can prevent the end portion on the side of the femur head from being scraped off. The movable separator is provided so that it can be separated from the fixed separator by the load applied when riding on the end portion on the side of the femur head. For this reason, the movable separator can prevent the end portion on the side of the femur head from being scraped off. Accordingly, it is possible to prevent bone flakes and the like from adhering to the cut off meat part, and improve the quality of the cut off meat part.

In the configuration, the controller may calculate a timing when the end portion of the femur moves to the front surface of the pusher main body on the basis of the measurement result of the leg meat measuring part, and the bone pressing pusher may push the pusher main body on the basis of the calculation result of the controller.

According to the above-mentioned configuration, it is possible to determine whether the end portion on the side of the femur head has moved to the front surface of the pusher main body using the measurement result of the leg meat measuring part without installing a separate sensor for the bone pressing pusher. For this reason, it is possible to accurately perform driving control of the bone pressing pusher.

A poultry leg meat deboning method according to the present invention is a poultry leg meat deboning method of performing a separation of a meat part from a femur with respect to a poultry leg meat to which a peeling off of the meat part has been performed until a side of a knee joint of the femur in a bone-in poultry leg meat which has been cut from a femur of a poultry carcass, the poultry leg meat deboning method including: an ankle holding process of holding an ankle of the poultry leg meat using an ankle holding part; a measurement process of measuring between at least a part of the poultry leg meat closer to the ankle holding part than the knee joint and a cutting part of the poultry leg meat on a side of a hip joint of the poultry leg meat, at a side closer to the femur than the ankle holding part in a state before the peeling off of the meat part of the poultry leg meat has been performed; a separator sandwiching process of sandwiching the femur with a separator from a direction crossing an extension direction of the femur in between the side of the knee joint of the femur and the meat part; a moving process of moving at least one of the ankle holding part and the separator so that one of the ankle holding part and the separator separates with respect to the other one of the ankle holding part and the separator while maintaining a state in which the separator is sandwiching and relatively moving the separator until an end portion of the femur on the side of a hip joint along the femur; and a cutting off process of cutting off the meat part from the femur at the end portion of the femur using a cutter after the moving process, wherein, in the moving process, movement amount of the separator with respect to the femur is determined on the basis of a measurement result from the measurement process.

The accuracy of position recognition of the end portion on the side of the femur head can be improved through this measurement process. For this reason, the cutter can easily enter while aiming toward a part close to the end portion on the side of the femur head where the meat part is peeled off by the separator. Here, the cutter can reduce the possibility of cutting the end portion on the side of the femur head. For this reason, it is possible to suppress chipping of the cutter edge and occurrence of failure of the poultry leg meat deboning device. There is no need to adjust an assembly position of the separator depending on the poultry leg meat. For this reason, assembly workability of the poultry leg meat deboning device can be improved. Since the meat part can be cut off from the femur while the remaining meat on the side of the femur is reduced, the deboning yield percentage can be improved.

In the method, in the ankle holding process, the poultry leg meat may be hung, and in the moving process, the separator may be moved to the end portion of the femur along the femur by pulling up the ankle holding part.

According to the above-mentioned method, the posture of the poultry leg meat can be easily controlled using gravity. The meat part can be easily peeled off the femur by the separator while the posture of the poultry leg meat is maintained.

In the method, an auxiliary clamp configured to hold a root of the femur of the poultry leg meat on the side of the knee joint without changing a relative position with respect to the root may be provided, and in the moving process, the auxiliary clamp may be moved in synchronization with the ankle holding part when the auxiliary clamp is moved.

According to the above-mentioned method, it is possible to prevent the tibia and the femur from being stretched by the peeling-off load of the meat part from the femur by the separator. For this reason, it is possible to prevent the position of the end portion on the side of the femur head from being shifted due to peeling off of the meat part from the femur by the separator.

In the method, in the separating process, the meat part may be cut off in a state in which the meat part is pulled from the femur on the side of a femur head toward an opposite side of the knee joint by the separator.

According to the above-mentioned method, the cutter can cut off the meat part from the femur in a state in which a tension is applied to the meat part. For this reason, the meat part can be cut in a good manner by the cutter. The remaining meat on the side of the femur can also be reduced as much as possible. Accordingly, the deboning yield percentage can be further improved.

In the method, in the separating process, the separator may cut off the meat part in a state in which the meat part is pulled from the femur on the side of femur head toward an opposite side of the knee joint.

According to the above-mentioned method, the meat part can be reliably cut off from the femur.

In the above mentioned method, the controller may calculate a timing when the end portion of the femur moves to the front surface of the pusher main body on the basis of the measurement result of the leg meat measuring part, and the bone pressing pusher may push the pusher main body on the basis of the calculation result of the controller.

According to the above-mentioned method, when the separator rides on the end portion on the side of the femur head, it is possible to prevent the separator from getting caught in the end portion on the side of the femur head. For this reason, the separator can prevent the end portion on the side of the femur head from being scraped off. Accordingly, it is possible to prevent bone flakes and the like from adhering to the cut off meat part, and improve quality of the cut off meat part.

Advantageous Effects of Invention

According to the present invention, the cutter can reduce the possibility of cutting the end portion on the side of the femur head. For this reason, it is possible to suppress the chipping of the cutter edge and the occurrence of failure of the poultry leg meat deboning device. There is no need to adjust an assembly position of the separator according to the poultry leg meat. For this reason, assembly workability of the poultry leg meat deboning device can be improved. Since the meat part can be cut off from the femur while the remaining meat on the side of femur is reduced, the deboning yield percentage can be improved.

DESCRIPTION OF EMBODIMENTS

Hereinafter, an embodiment of the present invention will be described with reference to the accompanying drawings.
<Automatic Deboning Device>

Figure 1:
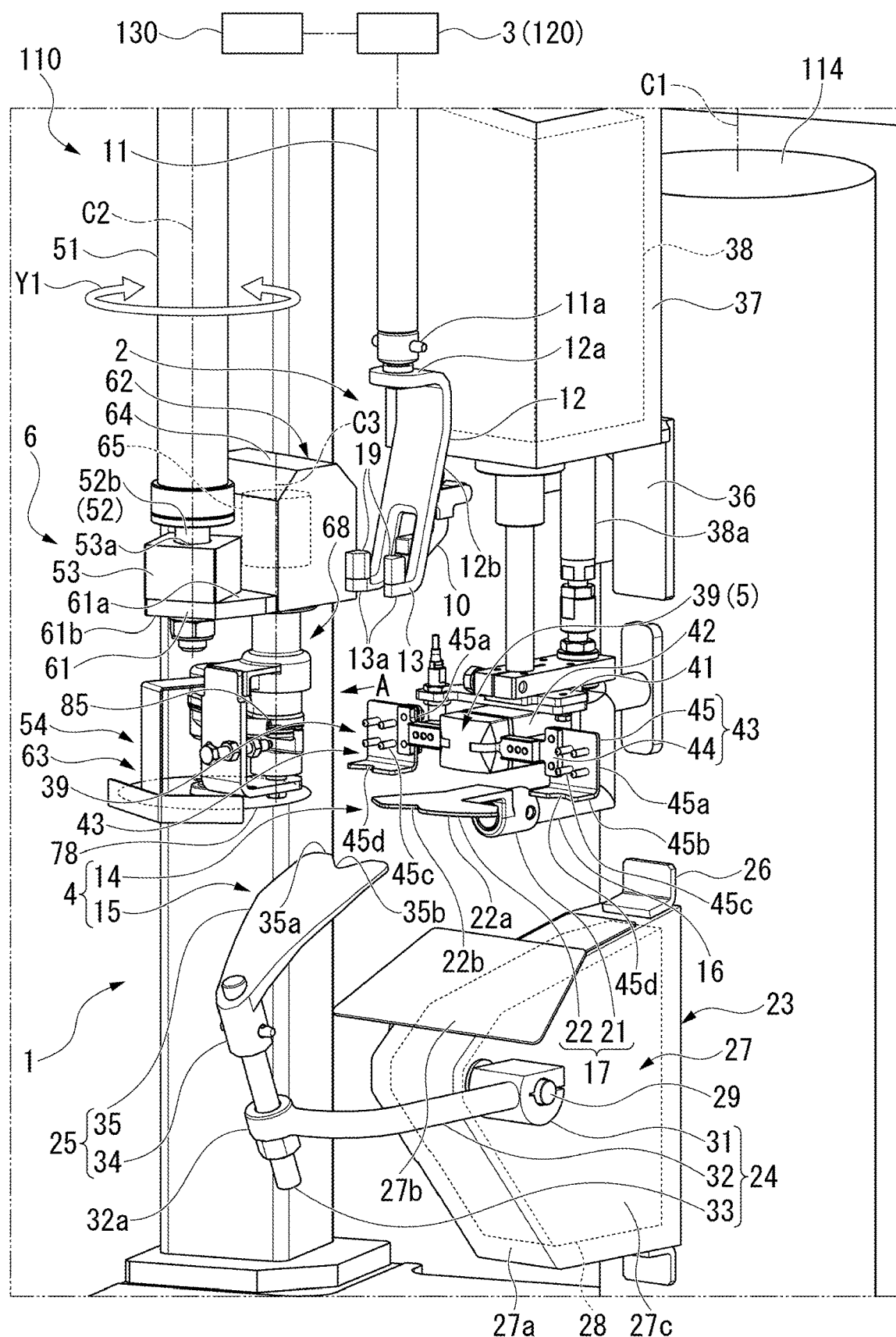
FIG. 1 is an enlarged perspective view of a separation device according to an embodiment of the present invention.

FIG. 1 is an enlarged perspective view of a separation device 1.

Figure 4:
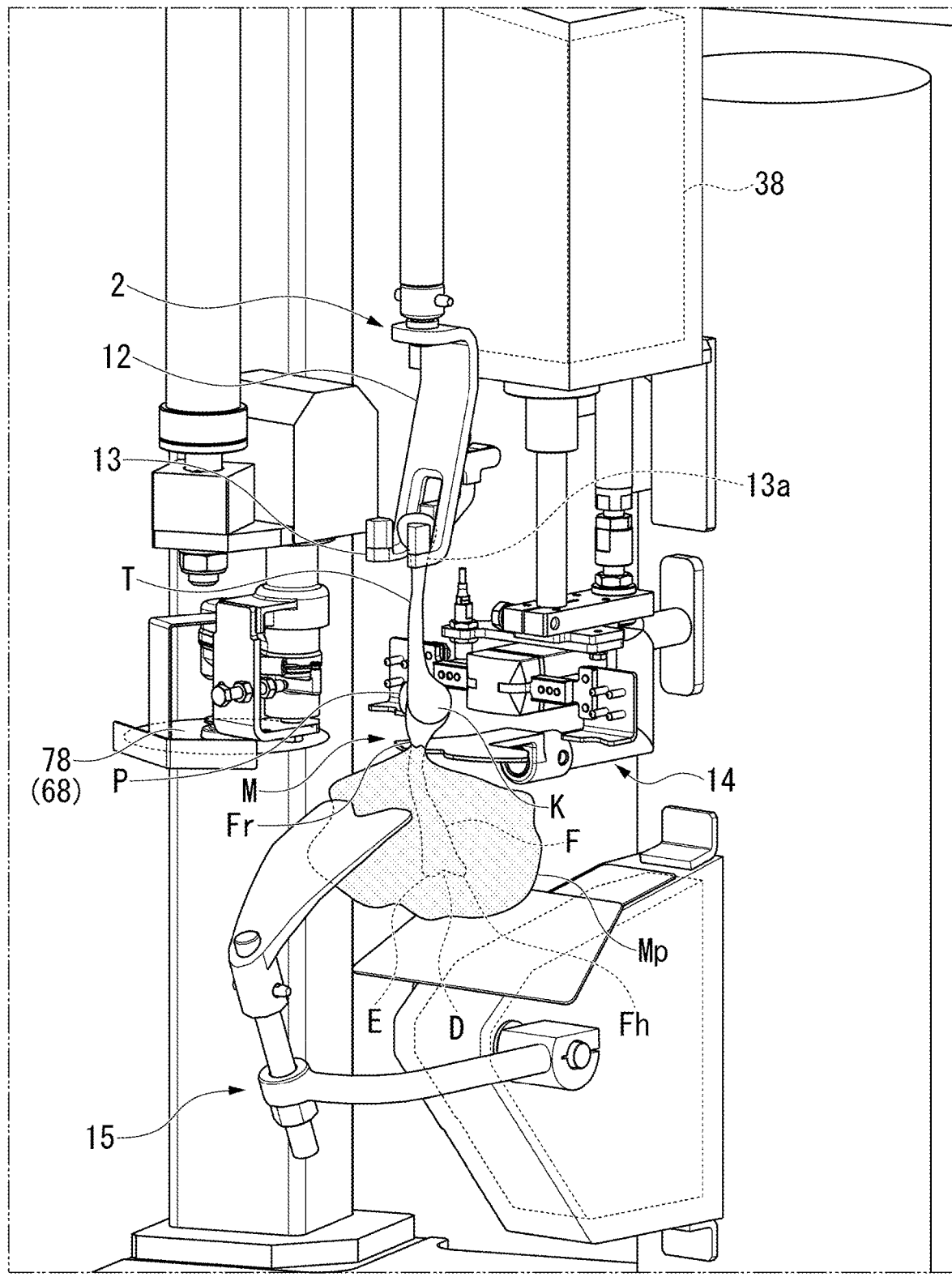
FIG. 4 is a perspective view of a separation device showing a state immediately after poultry leg meat is conveyed to a separation station according to the embodiment of the present invention.

The separation device 1 is provided in an automatic deboning device 110 configured to automatically debone a bone from poultry leg meat M (see FIG. 4). The automatic deboning device 110 includes a controller 130 configured to perform general driving control of the automatic deboning device 110, in addition to the separation device 1. Hereinafter, an upward/downward direction in a state in which the automatic deboning device 110 is placed on a floor (not shown) is simply referred to as an upward/downward direction, and a horizontal direction in this state is simply referred to as a horizontal direction.

As shown in FIG. 1, for example, a plurality of work stations are set in the automatic deboning device 110 in a circumferential direction around a center column 114 provided at a center in a horizontal direction. The plurality of work stations are work spaces set for processes of performing processing on poultry leg meat step by step. For example, in the automatic deboning device 110, a station where the poultry leg meat is input to the device, a station (hereinafter referred to as an slit-forming station) where slit-forming is performed on the input poultry leg meat, a station where the meat around the ankle of the poultry leg meat is cut, a station where a meat part is peeled off until a joint of the poultry leg meat, a station where articular muscle and knee cartilage are cut, a station (hereinafter referred to as a separation station) where the meat part is peeled off and deboned from the femur F (see FIG. 4), and a station where the bone remaining in the ankle holding part is discharged are set in sequence in the circumferential direction. Hereinafter, directions that are simply referred to as the radial direction and the circumferential direction are the radial direction of the center column 114 and the circumferential direction of the center column 114.

Devices having respective functions are provided in the stations. As the poultry leg meat M (see FIG. 4) is conveyed to the stations in sequence, processing is performed on the poultry leg meat M step by step. The separation device 1 is provided in the separation station. A partial configuration of the separation device 1 is provided in the slit-forming station (details will be described below). A power unit 120 configured to power each device is provided in the automatic deboning device 110. The power unit 120 includes, for example, a rotary table (not shown) configured to convey an ankle holding part 2 (to be described below) to the stations in sequence, or a partial configuration of the separation device 1 (details will be described below). In FIG. 1, illustration of the devices provided in the stations other than the separation device 1 is omitted.

<Separation Device>

The separation device 1 includes the ankle holding part 2 configured to hold an ankle A (see FIG. 4) of the poultry leg meat M, a moving part 3 configured to move the ankle holding part 2 upward/downward, a separator 4 provided below the ankle holding part 2, an auxiliary clamp 5 provided between the ankle holding part 2 and the separator 4, a cutter unit 6 provided on an outer side of the ankle holding part 2 in the radial direction, and a leg meat measuring part 7 provided in the slit-forming station. The moving part 3 constitutes the power unit 120.

<Ankle Holding Part>

The ankle holding part 2 includes a columnar support bar 11 extending upward/downward, and a hanger 12 provided on a lower end 11a of the support bar 11. In the following description, a state in which the ankle holding part 2 is conveyed to the separation station will be described.

The hanger 12 is formed in a C shape, an outer side in the radial direction of which is open when seen in the circumferential direction. An upper end 12a of the hanger 12 is attached to the lower end 11a of the support bar 11.

A bifurcated claw portion 13 is formed from a center of the hanger 12 in the upward/downward direction to a lower portion of the hanger 12. A tip 13a of a claw portion 13 is formed outward in the radial direction. A stopper convex portion 19 protruding upward is provided on the tip 13a of the claw portion 13. The ankle A of the poultry leg meat M is hooked on the claw portion 13 to get over the stopper convex portion 19. Accordingly, the ankle A of the poultry leg meat M is held on the hanger 12 (the ankle holding part 2), and the poultry leg meat M is hung on the hanger 12. The stopper convex portion 19 prevents the ankle A of the poultry leg meat M from slipping off the claw portion 13.

A discharge mechanism 10 is provided on a back surface 12b at a side opposite to an opening of the hanger 12 (an inner side in the radial direction). The discharge mechanism 10 discharges the bone over the stopper convex portion 19 from the hanger 12 in the station where the bone is discharged.

The moving part 3 is detachably connected to an upper end (not shown) of the support bar 11. A rotary table (not shown) is connected to the upper end of the support bar 11. Accordingly, the ankle holding part 2 is rotated around a shaft center C1.

The moving part 3 is, for example, an electric linear actuator in which a servomotor (not shown) is used. The electric linear actuator is provided such that a slider (not shown) moves in the upward/downward direction. In the ankle holding part 2 conveyed to the separation station, for example, the upper end of the support bar 11 is detachably connected to the slider (not shown) of the moving part 3. Accordingly, when the moving part 3 is driven, the ankle holding part 2 is pulled upward.

A pulling-up amount (an example of movement in the claims) of the ankle holding part 2 by the moving part 3 is detected by a sensor (not shown) provided in the moving part 3. The detection result is output to the controller 130 as a signal. In the controller 130, a pulling-up amount of the ankle holding part 2 is determined on the basis of the detection result of the leg meat measuring part 7. The pulling-up amount of the ankle holding part 2 in the separation station is an amount in which the separator 4 is located just below an end portion E (see FIG. 4) of the femur F on the side of a femur head Fh in a state in which the ankle holding part 2 is pulled up completely. The controller 130 performs driving control with reference to the determined pulling-up amount and the detection result from the moving part 3.

<Separator>

The separator 4 pinches the femur F of the poultry leg meat M from both sides in the radial direction. The separator 4 includes a fixed part 14 and a movable part 15, which are provided on an outer circumferential surface of the center column 114. The fixed part 14 includes a support bar 16 fixed to the outer circumferential surface of the center column 114, and a fixed separator 17 provided on an outer end (tip) of the support bar 16 in the radial direction.

The support bar 16 is formed by a round bar. The support bar 16 is formed in a crank shape directed outward in the radial direction. That is, the support bar 16 extends horizontally from the outer circumferential surface of the center column 114, extends to bend downward, and then, extends to bend outward in the radial direction again.

The fixed separator 17 includes a cylindrical fixed part 21 fitted and fixed to the tip of the support bar 16, and a fixed separator main body 22 provided integrally with an outer end of the fixed part 21 in the radial direction. The fixed separator main body 22 is a plate-shaped member extending in the horizontal direction. A concave portion 22b having a V-groove shape when seen in the upward/downward direction is formed in an outer side 22a of the fixed separator main body 22 in the radial direction.

The movable part 15 includes a driving part 23 fixed on the outer circumferential surface of the center column 114 at below the support bar 16 of the fixed part 14, an arm section 24 connected to the driving part 23, and a movable separator 25 provided on a side of the arm section 24 opposite to the driving part 23. The driving part 23 includes a waterproof case 27 fixed to the center column 114 via a bracket 26, and a separator actuator 28 accommodated in the waterproof case 27.

In the waterproof case 27, a guide plate 27b is provided on an outer surface 27a in the radial direction. The guide plate 27b is slanted so that a normal direction of one surface is slightly oblique to the upward/downward direction. The guide plate 27b guides the lower portion of the poultry leg meat M conveyed to the separation station, and the poultry leg meat M does not come into direct contact with the waterproof case 27.

The separator actuator 28 includes a rotary shaft 29 protruding via an outer surface 27c of the waterproof case 27 in the circumferential direction, and an actuator main body (not shown) configured to pivot the rotary shaft 29 within a predetermined angle range. The arm section 24 is connected to the rotary shaft 29. The actuator main body is constituted by, for example, an air cylinder, and a link mechanism connected to a rod of the air cylinder (neither is shown). The rotary shaft 29 is connected to the link mechanism. Accordingly, when the air cylinder is operated, the rotary shaft 29 is pivoted within the predetermined angle range.

The arm section 24 includes a cylindrical fixed part 31 fitted and fixed to the rotary shaft 29, a lateral arm 32 extending from the outer circumferential surface of the fixed part 31 toward an outer side in the radial direction, and a vertical arm 33 provided on an outer end of the lateral arm 32 in the radial direction. The lateral arm 32 and the vertical arm 33 are formed by a round bar. An annular connecting portion 32a is provided integrally with the outer end of the lateral arm 32 in the radial direction. As a lower end portion of the vertical arm 33 is inserted through and fixed to the connecting portion 32a, the lateral arm 32 and the vertical arm 33 are integrated with each other. The vertical arm 33 extends substantially along the upward/downward direction. The movable separator 25 is provided on the upper end of the vertical arm 33.

The movable separator 25 includes a cylindrical fixed part 34 fitted and fixed to the vertical arm 33, and a movable separator main body 35 provided integrally with the upper end of the fixed part 34. The movable separator main body 35 is a plate-shaped member extending in a direction substantially perpendicular to the vertical arm 33 toward the fixed separator main body 22. A plate thickness direction of the movable separator main body 35 substantially coincides with an extension direction of the vertical arm 33. An inner side 35a of the movable separator main body 35 in the radial direction faces the outer side 22a of the fixed separator main body 22 in the radial direction. A V-groove-shaped concave portion 35b is formed in the inner side 35a of the movable separator main body 35 in the radial direction when seen in the upward/downward direction. The concave portion 35b also faces the concave portion 22b of the fixed separator main body 22 in the radial direction.

With this configuration, when the driving part 23 is driven to pivot the rotary shaft 29, the arm section 24 and the movable separator 25 swing together with the rotary shaft 29. Then, the movable separator main body 35 is moved toward and away from the fixed separator main body 22. The femur F of the poultry leg meat M is pinched in a state in which the movable separator main body 35 approaches the fixed separator main body 22.

Here, the femur F is stored in the concave portions 22b and 35b of each of the separator main bodies 22 and 35. For this reason, in a state in which the femur F is sandwiched between the separator main bodies 22 and 35 from both sides in the radial direction, the entire circumference of the femur F becomes surrounded by the separator main bodies 22 and 35.

In the following description, in the separator 4, the position where the movable separator main body 35 advances and the movable separator main body 35 approaches the fixed separator main body 22 most is referred to as a pinching position. The position where the movable separator main body 35 retreats and the movable separator main body 35 is most separated from the fixed separator main body 22 is referred to as a retreated position.

<Auxiliary Clamp>

The auxiliary clamp 5 holds a root Fr (hereinafter, simply referred to as the root Fr) of the femur F of the poultry leg meat M on the side of a knee joint K (see FIG. 4) from both sides in the circumferential direction. The auxiliary clamp 5 includes a waterproof case 37 fixed to the outer circumferential surface of the center column 114 via a bracket 36, an auxiliary actuator 38 accommodated in the waterproof case 37, and an auxiliary clamp unit 39 attached to a plurality of (for example, two) rods 38a of the auxiliary actuator 38.

The plurality of rods 38a of the auxiliary actuator 38 protrude downward via the waterproof case 37. The auxiliary actuator 38 expands and contracts the plurality of rods 38a in the upward/downward direction. For example, an air cylinder is used as the auxiliary actuator 38.

The auxiliary clamp unit 39 includes a clamp actuator 42 fixed to tips (lower ends) of the rods 38a via an attachment base 41, and two clamp portions 43 attached to the clamp actuator 42.

The clamp actuator 42 is constituted by, for example, an air cylinder and a link mechanism, which are not shown. The clamp actuator 42 is disposed to be elongated in the radial direction, and for example, a rod (not shown) of the air cylinder slides in the radial direction. The two clamp portions 43 are attached to the outer end of the clamp actuator 42 in the radial direction such that the upward/downward direction is a rotary axis. The two clamp portions 43 are opened and closed (approach and separated from each other) by slide movement of the rod.

The two clamp portions 43 are line symmetrical around the clamping actuator 42 in the radial direction. For this reason, in the following description, only one of the two clamp portions 43 will be described, and description of the other clamp portion 43 will be omitted. In the following description, a case in which the two clamp portions 43 are located at an opened position is referred to as a clamp opened position, and a case in which the two clamp portions 43 are located at a closed position is referred to as a clamp closed position. The two clamp portions 43 face each other in the circumferential direction at the clamp closed position.

The clamp portions 43 include arms 44 extending in the horizontal direction, and clamp main bodies 45 attached to the arms 44. The clamp main bodies 45 are formed in an L shape in a cross section in the upward/downward direction. That is, the clamp main bodies 45 are constituted by longitudinal wall portions 45a extending in the upward/downward direction, and lateral wall portions 45b extending to be bent from lower ends of the longitudinal wall portions 45a in the horizontal direction. The lateral wall portions 45b extend from the longitudinal wall portions 45a in a facing direction of the two clamp portions 43 at the clamp closed position. A plurality of protrusions 45c protrude from the longitudinal wall portions 45a in the same direction as the extension direction of the lateral wall portions 45b. A V-groove-shaped concave portion 45d when seen in the upward/downward direction is formed at a side of a tip of the lateral wall portion 45b in the horizontal direction.

Under this configuration, when the clamp actuator 42 is driven to the clamp closed position, the root Fr of the femur F in the poultry leg meat M is held from both sides in the circumferential direction by the two clamp portions 43. Here, the root Fr is accommodated in the concave portion 45d of each of the lateral wall portions 45b. For this reason, the entire circumference of the root Fr is surrounded by each of the lateral wall portions 45b while being held by each of the clamp portions 43 from both sides of the root Fr of the femur F in the circumferential direction. The longitudinal wall portions 45a rise from each of the lateral wall portions 45b at the clamp closed position on both sides of the knee joint K in the circumferential direction. The protrusions 45c formed on the longitudinal wall portions 45a abut the knee joint K at the clamp closed position.

<Cutter Unit>

The cutter unit 6 includes a support pipe 51 fixed to a frame (not shown), disposed on an outer side of the ankle holding part 2 in the radial direction and extending in the upward/downward direction, a columnar driving bar 52 passing through the support pipe 51 and protruding from above and below the support pipe 51, and a unit main body 54 attached to a lower end 52b of the driving bar 52 via an attachment block 53. The driving bar 52 is pivoted within a predetermined range around a shaft center C2 by a unit driving part (not shown).

A through-hole 53a passing in the upward/downward direction is formed in the attachment block 53 provided on the lower end 52b of the driving bar 52. The driving bar 52 is inserted and fixed into the through-hole 53a. The unit main body 54 is attached to a lower end of the attachment block 53.

<Unit Main Body>

The unit main body 54 includes a root section 61 attached to a lower end of the attachment block 53, a cutter driving part 62 provided on an upper surface 61a of the root section 61, and a swing unit 63 provided on a lower surface 61b of the root section 61. The root section 61 extends from the lower end of the attachment block 53 substantially in the circumferential direction. The cutter driving part 62 is provided at a side of the root section 61 opposite to the attachment block 53.

The cutter driving part 62 includes a waterproof case 64, and an electric motor 65 accommodated in the waterproof case 64. For example, a brushless motor or the like is used as the electric motor 65. A rotary shaft (not shown) of the electric motor 65 protrudes downward via the root section 61. The rotary shaft extends in parallel with the shaft center C2 of the driving bar 52. The rotary shaft is offset from the driving bar 52 via the root section 61 in this way. For this reason, the rotary shaft (the cutter driving part 62) is swung around the shaft center C2 to approach and be separated from the ankle holding part 2 according to pivoting of the driving bar 52 (see an arrow Y1 in FIG. 1).

Figure 2:
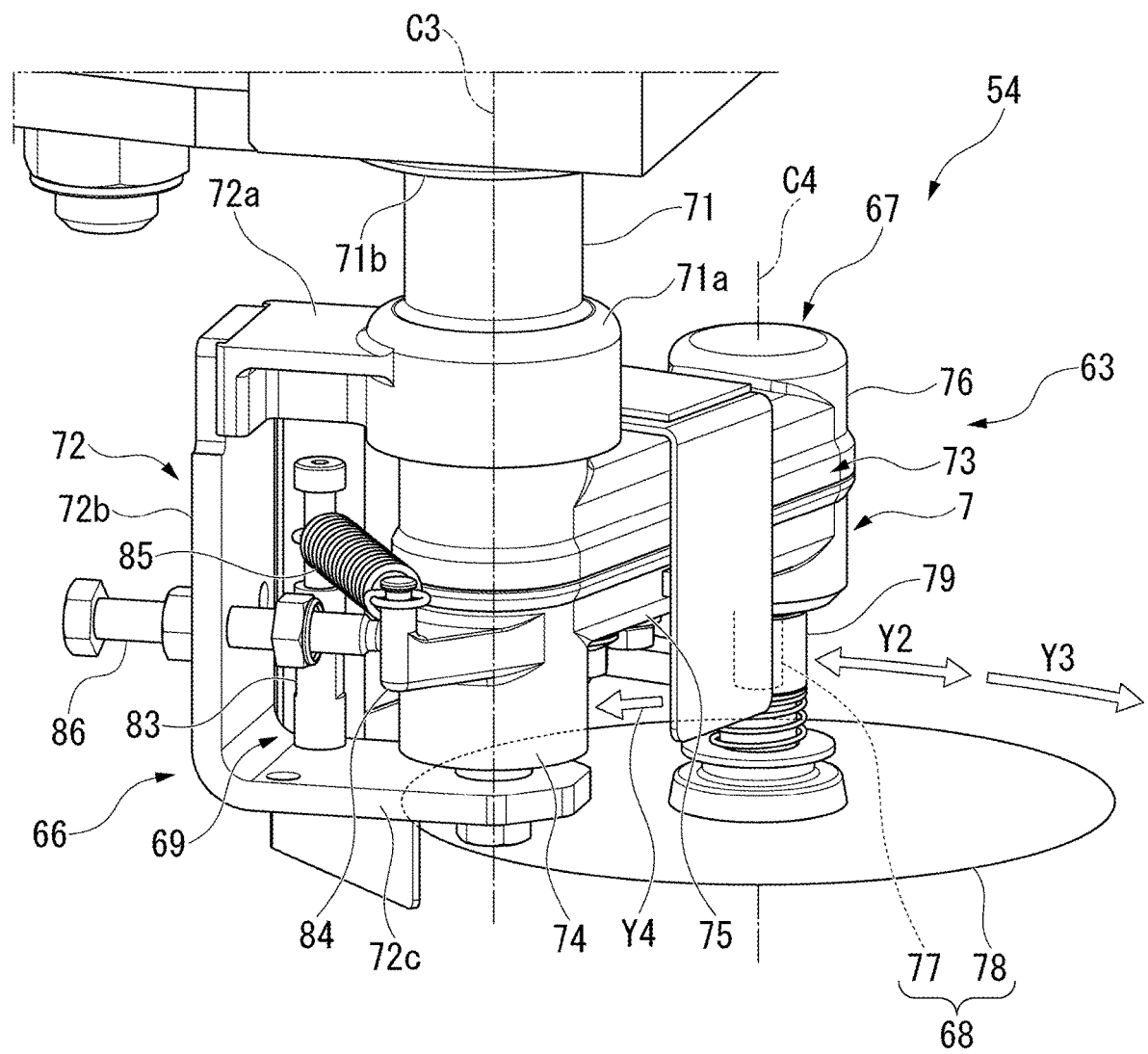
FIG. 2 is a view along an arrow A of FIG. 1.

FIG. 2 is a view along an arrow A of FIG. 1.

As shown in FIG. 1 and FIG. 2, the swing unit 63 includes a support part 66 attached to the lower surface 61b of the base section 61, a cutter holding part 67 rotatably provided on the support part 66, a round cutting edge cutter (an example of the cutter in the claims) 68 held on the cutter holding part 67, and a biasing part 69 configured to elastically bias the cutter holding part 67 toward the ankle holding part 2.

The support part 66 includes a support pipe 71 extending in the upward/downward direction, and a lower portion support part 72 provided integrally with a lower end 71a of the support pipe 71. An upper end 71b of the support pipe 71 is fixed to the lower surface 61b of the base section 61. A shaft center C3 of the support pipe 71 is disposed coaxially with the rotary shaft (not shown) of the electric motor 65. An intermediate shaft (not shown) is inserted into the support pipe 71. The intermediate shaft is connected to the rotary shaft. The intermediate shaft transmits rotation of the rotary shaft to the round cutting edge cutter 68.

The lower portion support part 72 is formed in a C shape when seen in the radial direction of the support pipe 71. That is, the lower portion support part 72 is constituted by an upper lateral wall 72a extending from the lower end 71a of the support pipe 71 in the horizontal direction, a longitudinal wall 72b extending downward from an end of the upper lateral wall 72a opposite to the support pipe 71, and a lower lateral wall 72c extending from a lower end of the longitudinal wall 72b in the horizontal direction. The upper lateral wall 72a and the lower lateral wall 72c are disposed to face each other in the upward/downward direction. The cutter holding part 67 is rotatably supported by the upper lateral wall 72a and the lower lateral wall 72c.

The cutter holding part 67 includes a housing 73, and a power transmission mechanism (not shown) provided in the housing 73. The housing 73 includes a cylindrical longitudinal support part 74, both ends of which are rotatably supported by the upper lateral wall 72a and the lower lateral wall 72c, a hollow lateral support part 75 protruding from the outer circumferential surface of the longitudinal support part 74 in the horizontal direction, and a cylindrical cutter shaft support part 76 provided integrally with a side of the lateral support part 75 opposite to the longitudinal support part 74.

A shaft center C4 of the cutter shaft support part 76 is parallel to the shaft center C3 of the support pipe 71. The cutter shaft support part 76 is swung about the shaft center C3 of the support pipe 71 to approach and be separated from the ankle holding part 2 (see an arrow Y2 in FIG. 2).

The longitudinal support part 74, the lateral support part 75 and the cutter shaft support part 76 are in internal communication with each other. A power transmission part (not shown) is provided on the longitudinal support part 74, the lateral support part 75 and the cutter shaft support part 76. The round cutting edge cutter 68 is supported on the cutter shaft support part 76. The power transmission part (not shown) transmits rotation of the intermediate shaft connected to the rotary shaft of the electric motor 65 to the round cutting edge cutter 68. The power transmission part normally transmits rotation of the rotary shaft (intermediate shaft) of the electric motor 65 to the round cutting edge cutter 68 also during swinging of the cutter holding part 67.

The round cutting edge cutter 68 includes a cutter shaft 77 rotatably supported on the cutter shaft support part 76, and a round cutting edge main body (an example of the cutter in the claims) 78 detachably attached to the cutter shaft 77 via an attachment portion 79. Rotation of the rotary shaft of the electric motor 65 is transmitted to the cutter shaft 77 via the intermediate shaft and the power transmission part, which are not shown. The lower portion of the cutter shaft 77 protrudes downward from the lower end of the cutter shaft support part 76. The attachment portion 79 is provided at the protruded place. Accordingly, the round cutting edge main body 78 is detachably attached to the lower end of the cutter shaft 77. The round cutting edge main body 78 is a cutting edge formed in a disk shape. The round cutting edge main body 78 is rotated integrally with the cutter shaft 77.

The biasing part 69 includes a first support pin 83 standing on the upper surface of the lower lateral wall 72c in the lower portion support part 72, a second support pin 84 provided integrally with the longitudinal support part 74 in the cutter holding part 67, and a tension spring 85 engaged with the first support pin 83 and the second support pin 84. The second support pin 84 is disposed on the outer circumferential surface of the longitudinal support part 74 at a side opposite to the lateral support part 75. The second support pin 84 is pulled toward the first support pin 83 by the tension spring 85. Accordingly, the cutter shaft support part 76 (the round cutting edge cutter 68) is elastically biased toward the ankle holding part 2 (see an arrow Y3 in FIG. 2).

An adjustment screw 86 facing the second support pin 84 in the horizontal direction is provided on the longitudinal wall 72b of the lower portion support part 72. The second support pin 84 abuts the tip of the adjustment screw 86. The second support pin 84 is normally pulled toward the first support pin 83 by the tension spring 85. For this reason, the second support pin 84 normally abuts the tip of the adjustment screw 86 at the initial posture. Accordingly, the initial posture of the cutter holding part 67 is adjusted according to the screwing-in amount of the adjustment screw 86.

With this configuration, the cutter unit 6 rotates the round cutting edge cutter 68 using the cutter driving part 62, and pivots the driving bar 52 in a predetermined range about the shaft center C2 using the unit driving part (not shown). When the driving bar 52 is pivoted, the unit main body 54 (the cutter driving part 62, the swing unit 63) is swung to approach and be separated from the ankle holding part 2. In the following description, in the cutter unit 6, a position where the round cutting edge cutter 68 of the unit main body 54 gets closest to the ankle holding part 2 is referred to as an advanced position. A position where the round cutting edge cutter 68 of the unit main body 54 gets farthest from the ankle holding part 2 is referred to as a retreated position. At the advanced position of the cutter unit 6, the round cutting edge cutter 68 is located directly above the fixed separator 17.

<Leg Meat Measuring Part>

Figure 3:
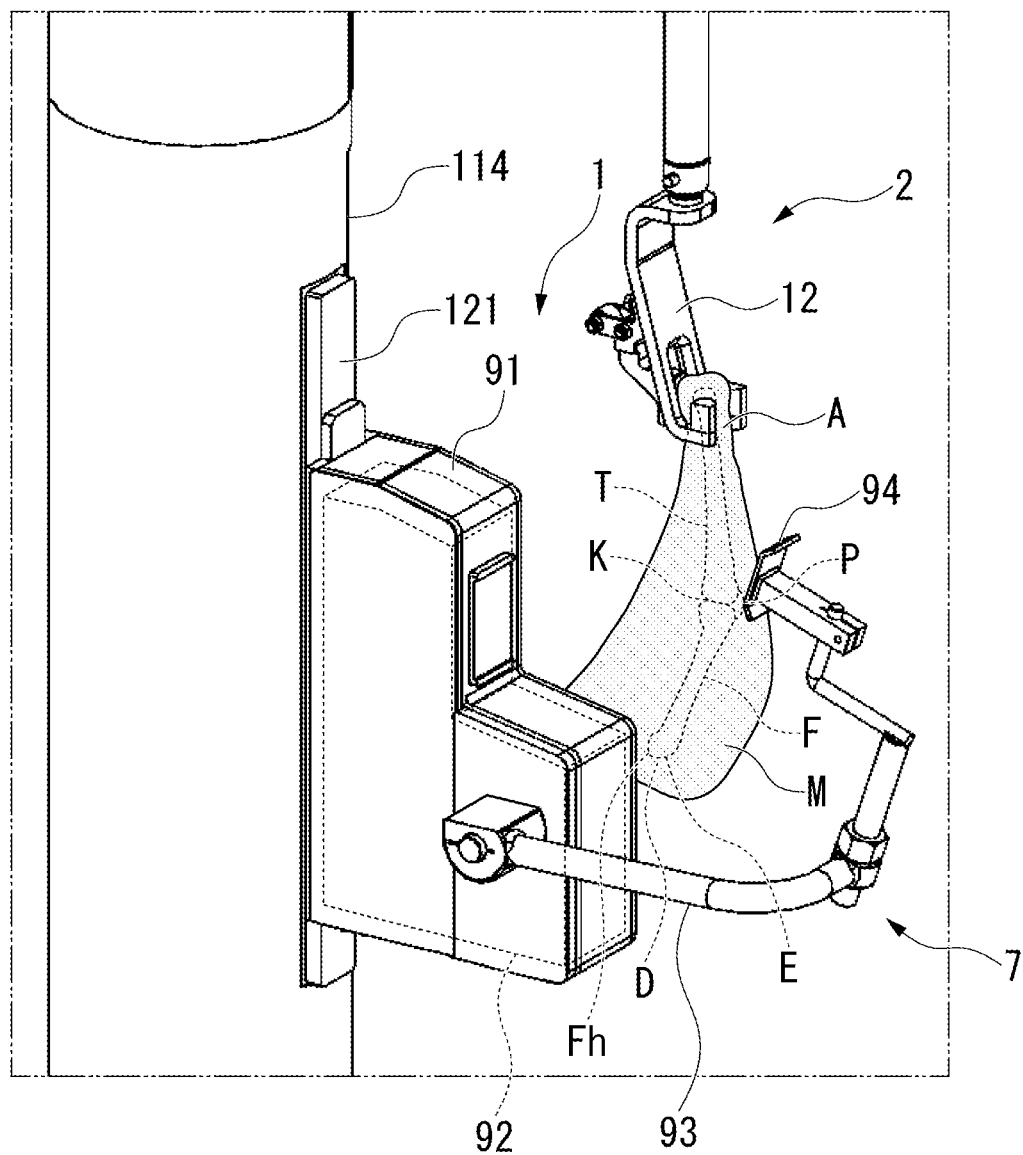
FIG. 3 is a perspective view of a leg meat measuring part according to the embodiment of the present invention.

FIG. 3 is a perspective view of the leg meat measuring part 7.

As shown in FIG. 3, the leg meat measuring part 7 provided in the slit-forming station includes a waterproof case 91 fixed to the outer circumferential surface of the center column 114 via an attachment pedestal 121, a leg meat measurement actuator 92 accommodated in the waterproof case 91, an encoder (not shown) provided in the leg meat measurement actuator 92, and a measurement arm 93 connected to the leg meat measurement actuator 92. The leg meat measuring part 7 measures an external form of the poultry leg meat when the ankle holding part 2 is pulled up by the moving part 3 in the slit-forming station (details will be described below).

The measurement arm 93 is formed to extend outward in the radial direction from the waterproof case 91 in the horizontal direction, and then, is formed to be curved to fold back upward. An abutting plate 94 abutting the poultry leg meat is provided on the tip of the measurement arm 93. The measurement arm 93 is pivoted by the leg meat measurement actuator 92 such that the abutting plate 94 moves about the root end of the measurement arm 93 in the upward/downward direction. The pivoting position is detected by the encoder (not shown). The detection result by the encoder is output to the controller 130 as a signal. In the following description, in the leg meat measuring part 7, a position where the abutting plate 94 is raised is referred to as a measurement position, and a position where the abutting plate 94 is lowered is referred to as a retreated position.

<Operation of Separation Device>

Next, operations of the separation device 1 will be described on the basis of FIG. 1, FIG. 3, and FIG. 4 to FIG. 8.

FIG. 4 is a perspective view of the separation device 1 showing a state immediately after the poultry leg meat M is conveyed to the separation station.

As shown in FIG. 4, upon conveyance of the poultry leg meat M to the separation station, the poultry leg meat M is hung such that the ankle A is hooked to the claw portion 13 of the hanger 12 provided on the ankle holding part 2. Accordingly, the ankle A of the poultry leg meat M is held on the hanger 12 (the ankle holding part 2) (ankle holding process).

Here, the posture of the poultry leg meat M is in a state in which the tibia T is located above and the femur F is located below. The body height direction of the poultry leg meat M in which the tibia T or the femur F extends is the extension direction of the poultry leg meat M. The extension direction of the poultry leg meat M hung on the hanger 12 substantially coincides with the upward/downward direction. In the separation station, the poultry leg meat M is conveyed in a state in which a meat part Mp is peeled off until the knee joint K of the femur F in the previous process of the separation station.

As shown in FIG. 3, before the poultry leg meat M is conveyed to the separation station, in the slit-forming station, the external form of the poultry leg meat M is measured by the leg meat measuring part 7.

In the slit-forming station, the ankle holding part 2 has the tip 13a of the claw portion 13 on the hanger 12 facing outward in the radial direction. In this state, in the posture of the poultry leg meat M, a kneecap P faces outward in the radial direction. At the time the ankle holding part 2 is conveyed to the slit-forming station by the power unit 120, the leg meat measuring part 7 is located at the retreated position. After that, the leg meat measuring part 7 is moved to the measurement position. Then, the abutting plate 94 of the leg meat measuring part 7 abuts slightly above the kneecap P of the poultry leg meat M.

Next, the ankle holding part 2 is pulled up by the moving part 3. Then, when the ankle holding part 2 is pulled up by the moving part 3, the abutting plate 94 of the leg meat measuring part 7 is displaced while following the shape of the poultry leg meat M outside in the radial direction. The measurement arm 93 is pivoted by displacement of the abutting plate 94. An external form of the poultry leg meat M where the abutting plate 94 was in contact is detected by detecting the pivoting position of the measurement arm 93 using the encoder (not shown). When the detection result is output to the controller 130 as a signal, it is stored by the controller 130 as measurement information of a place of the poultry leg meat M where the abutting plate 94 was in contact with. That is, measurement of the poultry leg meat M by the leg meat measuring part 7 between a part closer to the ankle holding part 2 than the knee joint K and a cutting part D of the femur F on the side of the hip joint is completed (measurement process)

As shown in FIG. 4, at the time the ankle holding part 2 is conveyed to the separation station by the power unit 120, the ankle holding part 2 has the tip 13a of the claw portion 13 on the hanger 12 facing outward in the radial direction. In this state, in the posture of the poultry leg meat M, the kneecap P is directed outward in the radial direction, and the femur head Fh is directed toward a side opposite to the round cutting edge cutter 68 (a right side in FIG. 4) in the circumferential direction. At this time, the separator 4 is located at the retreated position, the auxiliary clamp 5 is located at the clamp opened position, and the cutter unit 6 is located at the retreated position. The auxiliary clamp 5 has the auxiliary clamp unit 39 located at the lowermost end position by the auxiliary actuator 38.

Figure 5:
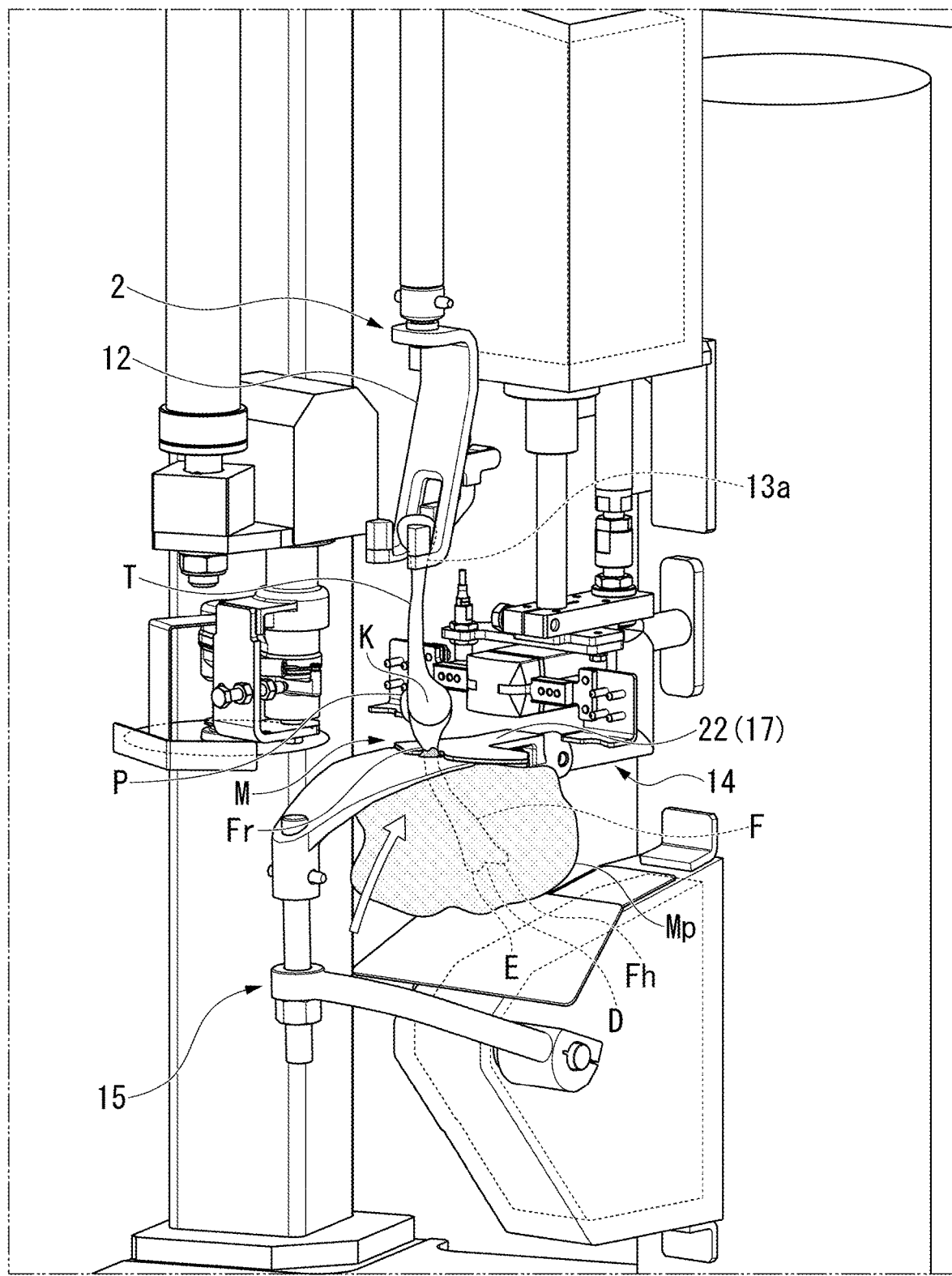
FIG. 5 is a perspective view of the separation device showing a state in which a separator according to the embodiment of the present invention is located at a pinching position.

FIG. 5 is a perspective view of the separation device 1 showing a state in which the separator 4 is located at the pinching position.

As shown in FIG. 5, after the above mentioned process, the separator 4 is set at the pinching position, and the femur F is pinched by the separator main bodies 22 and 35 from both sides of the femur F in the radial direction (separator sandwiching process). Next, pulling-up of the ankle holding part 2 by the moving part 3 is started.

Figure 6:
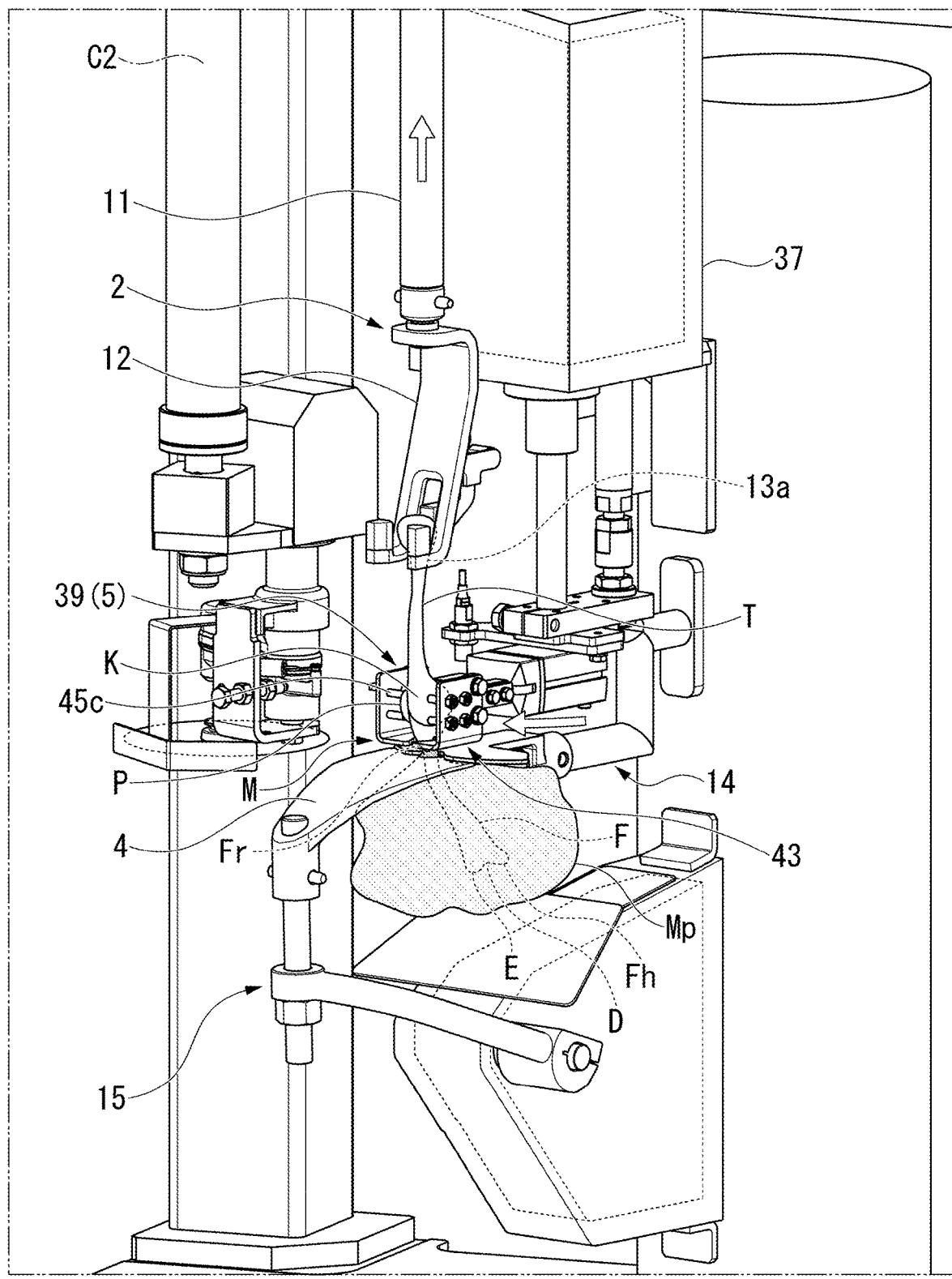
FIG. 6 is a perspective view of the separation device showing a state in which the separator according to the embodiment of the present invention is located at a pinching position and an auxiliary clamp is located at a clamp opened position.

FIG. 6 is a perspective view of the separation device 1 showing a state in which the separator 4 is set at the pinching position and the auxiliary clamp 5 is at the clamp closed position.

An opening/closing timing of the auxiliary clamp 5 is controlled by the controller 130. Since the shape of the poultry leg meat M from a part closer to the ankle holding part 2 than the knee joint K until the cutting part D of the femur F on the side of the hip joint is stored in the controller 130 based on the results detected by the leg meat measuring part 7, the positional information of the knee joint K of the poultry leg meat M is also stored.

As shown in FIG. 6, the controller 130 adjusts a clamp timing of the auxiliary clamp 5 on the basis of positional information (a measurement result by the leg meat measuring part 7) of the knee joint K and movement amount of the ankle holding part 2 by the moving part 3. That is, auxiliary clamp 5 is located at the clamp closed position at the timing when the ankle holding part 2 is pulled up by a desired movement amount on the basis of positional information of the knee joint K in a state in which the auxiliary clamp unit 39 is waiting at the lowermost end position without being moved in the upward/downward direction. Accordingly, the root Fr of the femur F of the poultry leg meat M on the side of the knee joint K is accurately held from both sides in the circumferential direction by the clamp portions 43 of the auxiliary clamp 5.

At the clamp closed position, the protrusions 45c formed on the clamp portions 43 are pressed against the knee joint K. For this reason, the knee joint K side of the tibia T and the knee joint K side of the femur F are firmly held together. During such movement of the auxiliary clamp 5, the ankle holding part 2 is continuously pulled up by the moving part 3 without stopping.

Figure 7:
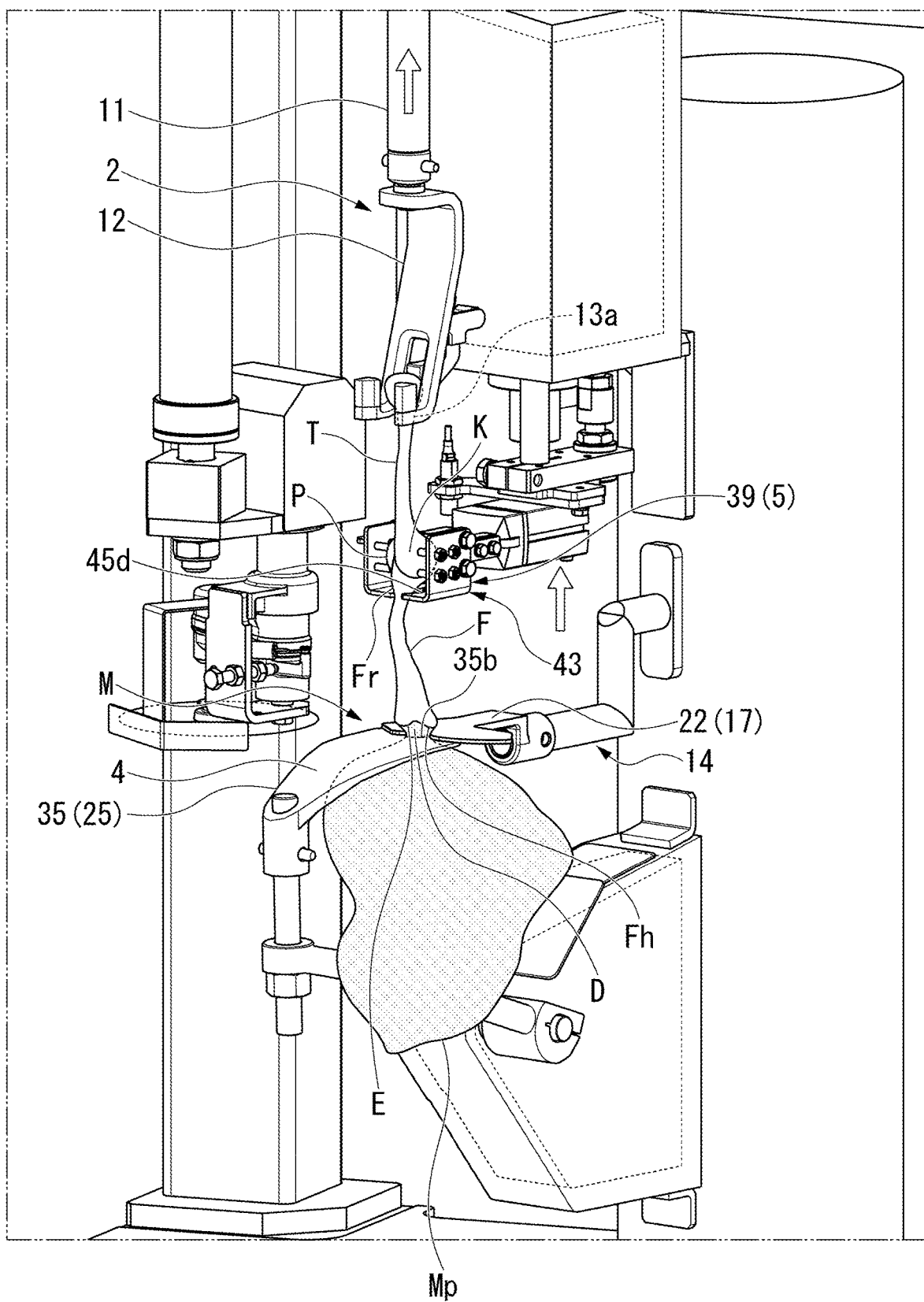
FIG. 7 is a perspective view of the separation device showing a state in which the ankle holding part and the auxiliary clamp according to the embodiment of the present invention are pulled up.

FIG. 7 is a perspective view of the separation device 1 showing a state in which the ankle holding part 2 and the auxiliary clamp 5 are pulled up.

As shown in FIG. 7, after the auxiliary clamp 5 is located at the clamp closed position, the auxiliary clamp 5 is pulled up synchronously with the ankle holding part 2 by the auxiliary actuator 38. Here, the auxiliary clamp unit 39 follows the movement of the femur F. For this reason, the ankle holding part 2 and the auxiliary clamp 5 are pulled up without changing the relative positions between the clamp portions 43 and the root Fr of the femur F (moving process). The separator 4 maintains its pinching position.

Then, since the vertical position of the separator 4 is not changed, as a result, the separator 4 moves downward along the femur M of the poultry leg meat M with respect to the femur F. The meat part Mp is peeled off downward from the femur by the separator 4. Here, by storing the femur F in the concave portion 35b formed in each of the separator main bodies 22 and 35 of the separator 4, the entire circumference of the femur F is surrounded by the separator main bodies 22 and 35. In this state, since the meat part Mp is peeled off downward, the meat part Mp remains on the femur F as little as possible.

Here, the load of the meat part Mp during peeling off is distributed to the hanger 12 of the ankle holding part 2 and the clamp portions 43 of the auxiliary clamp 5. For this reason, the femur F or the tibia T will not be cut off by the load when the meat part Mp is peeling off. The auxiliary clamp 5 prevents the portion between the tibia T and the femur F from being stretched by the load when the meat part Mp is peeling off. Here, the circumference of the knee joint K is surrounded by the concave portions 45d of the clamp portions 43 and the longitudinal wall portions 45a. For this reason, the knee joint K is securely held by the auxiliary clamp 5. Accordingly, it is surely prevented that the portion between the tibia T and the femur F is stretched by the load when the meat part Mp is peeling off.

The controller 130 stops driving of the moving part 3 when the ankle holding part 2 is pulled up by a pulling-up amount on the basis of the detection result of the leg meat measuring part 7. Here, the tibia T or the femur F is kept normal by the auxiliary clamp 5. For this reason, upon the driving stoppage of the moving part 3, the separator 4 is positioned just below the end portion E on the side of the femur head Fh. A position of the end portion E on the side of the femur head Fh in the upward/downward direction is held constantly.

In the separator actuator 28, to which the movable separator 25 of the separator 4 is connected, the movable separator main body 35 is slightly separated from the fixed separator main body 22 by the load applied when the movable separator main body 35 rides on the femur head Fh. Accordingly, damage to the femur head Fh by the separator 4 is suppressed. The separator 4 maintains its pinching position. For this reason, in a state in which the ankle holding part 2 is pulled up by the predetermined pulling-up amount, the separator 4 pulls the meat part Mp from the side of the femur head Fh to the opposite side (lower side) of the knee joint K.

Figure 8:
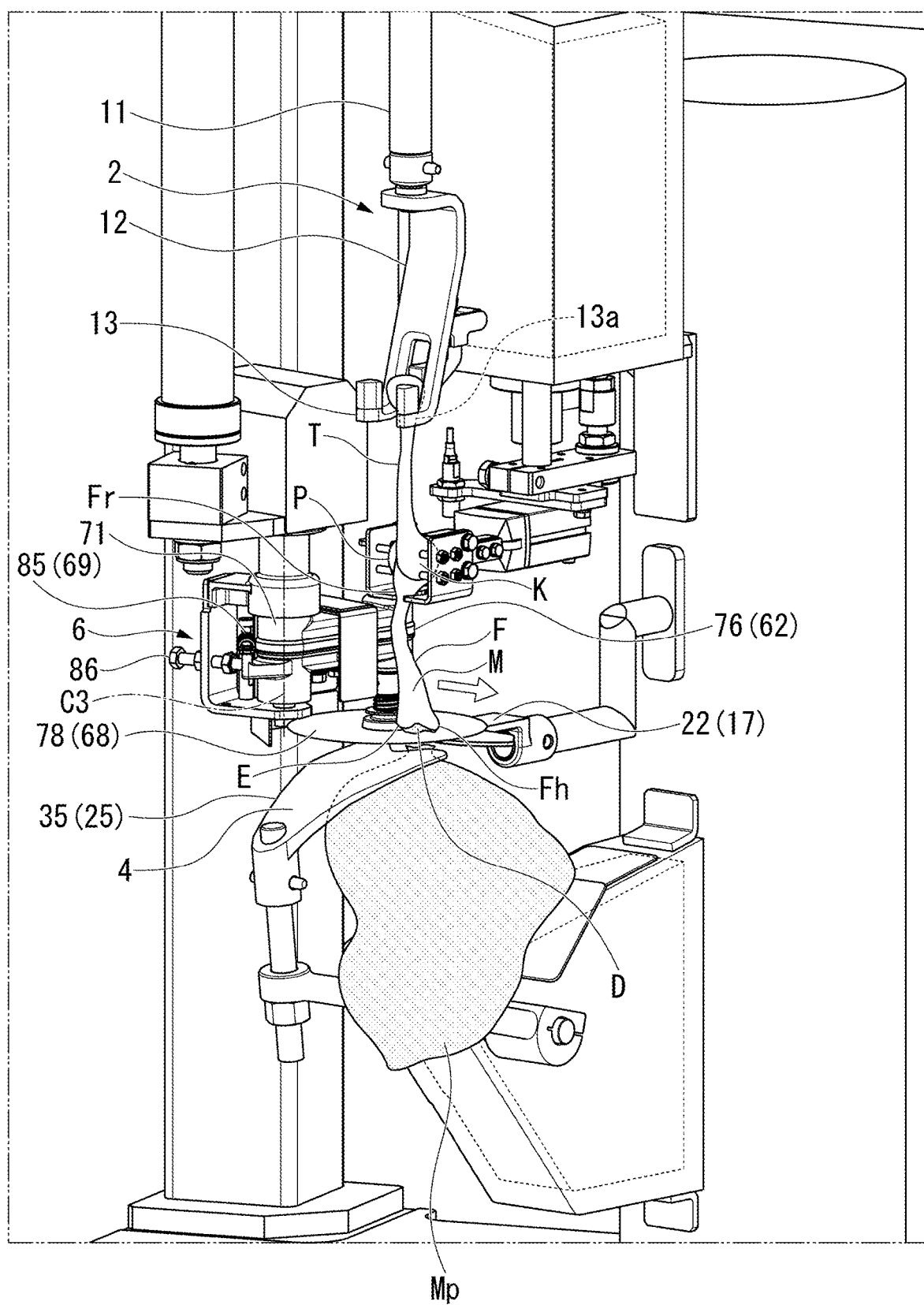
FIG. 8 is a perspective view of the separation device showing a state in which a cutter unit according to the embodiment of the present invention is located at an advanced position.

FIG. 8 is a perspective view of the separation device 1 showing a state in which the cutter unit 6 is located at the advanced position.

As shown in FIG. 8, after the moving process, the cutter unit 6 is moved to the advanced position. The moving direction of the round cutting edge cutter 68 in the cutter unit 6 follows the horizontal direction because it moves about the shaft center C2. The moving direction of the round cutting edge cutter 68 is a direction substantially perpendicular with respect to the extension direction (upward/downward direction) of the femur F.

At the time the ankle holding part 2 is conveyed to the separation station, in the posture of the poultry leg meat M, the kneecap P is directed to an outer side in the radial direction. The femur head Fh is directed toward a side opposite to the round cutting edge cutter 68 in the circumferential direction. For this reason, when the cutter unit 6 is moved to the advanced position, the round cutting edge main body 78 is moved from the side opposite to the femur head Fh toward the side in which the femur head Fh is located. The round cutting edge main body 78 passes just below the end portion E (i.e., the cutting part D) on the side of the femur head Fh while the meat part Mp is pulled from the side of the femur head Fh toward the side opposite to the knee joint K (lower side) by the separator 4. Accordingly, the meat part Mp is cut off from the femur F (cutting off process). Accordingly, the operations of the separation device 1 are terminated.

The poultry leg meat M is pulled up by the moving process on the basis of the measurement result of the poultry leg meat M by the measurement process. For this reason, the position of the end portion E on the side of the femur head Fh when the cutting off process is started is almost kept in a constant position (height). For this reason, while the horizontal movement position of the round cutting edge main body 78 is constant, a close edge of the end portion E on the side of the femur head Fh can be aimed as the cutting position of the round cutting edge main body 78.

The cutter shaft support part 76 that supports the round cutting edge cutter 68 swings about the shaft center C3 of the support pipe 71. For this reason, when the round cutting edge main body 78 hits the femur F, the round cutting edge main body 78 swings as it escapes away from the femur F against the spring force of the tension spring 85 in the biasing part 69 (see also an arrow Y4 in FIG. 2), and the impact is attenuated. For this reason, for example, it is possible to prevent the cutting edge of the round cutting edge main body 78 from being chipped due to an excessive load on the round cutting edge main body 78.

On the other hand, when the round cutting edge cutter 68 properly moves just under the end portion E on the side of the femur head Fh, the biasing part 69 elastically biases the cutter holding part 67 toward the ankle holding part 2. For example, the round cutting edge cutter 68 is not swung unnecessarily.

In this way, the separation device 1 includes the ankle holding part 2, the leg meat measuring part 7, the separator 4, the moving part 3, a controller 8, and the round cutting edge cutter 68. For this reason, the leg meat measuring part 7 and the controller 8 can improve accuracy of position recognition of the end portion E on the side of the femur head Fh. Accordingly, the round cutting edge main body 78 can easily enter while aiming toward a part close to the end portion E on the side of the femur head Fh, from which the meat part Mp is peeled off by the separator 4. Here, the round cutting edge main body 78 reduces probability of cutting the end portion E on the side of the femur head Fh. As a result, the edge of the round cutting edge main body 78 can be suppressed from being chipped. Occurrence of a failure of the separation device 1 (the automatic deboning device 110) can be suppressed. It is no longer necessary to adjust the assembly position of the separator 4 to match the poultry leg meat M. For this reason, assembly workability of the separation device 1 can be improved. It is possible to separate the meat part Mp from the femur F while reducing the remaining meat on the side of the femur F. Accordingly, a deboning yield percentage of the separation device 1 can be improved.

The separation device 1 hangs the poultry leg meat M using the ankle holding part 2. As the moving part 3 pulls up the ankle holding part 2, the separator 4 is moved downward with respect to the poultry leg meat M. For this reason, the posture of the poultry leg meat M can be easily controlled using gravity. The meat part Mp can be easily peeled off the femur F by the separator 4 while maintaining the posture of the poultry leg meat M. Since the separation device 1 may be configured to move only the ankle holding part 2, the configuration of the separation device 1 can be simplified.

The separation device 1 includes the auxiliary clamp 5. The auxiliary clamp 5 holds the root Fr of the femur F of the poultry leg meat M on the side of the knee joint K without changing the relative position of the femur F with respect to the root Fr. For this reason, it is possible to prevent the tibia T and the femur F from being stretched by the peeling-off load of the meat part Mp from the femur F by the separator 4. For this reason, it is possible to prevent the position of the end portion E on the side of the femur head Fh from being shifted by the peeling off of the meat part Mp from the femur F by the separator 4.

The controller 130 controls the ankle holding part 2 to be located at the clamp closed position at the timing when being pulled up by the desired movement amount on the basis of the positional information of the knee joint K in a state in which the auxiliary clamp unit 39 waits at the lowermost end position without being moved in the upward/downward direction. For this reason, movement of the auxiliary clamp unit 39 in the upward/downward direction does not require complicated control, and the separation device 1 can be simplified. The clamp portions 43 of the auxiliary clamp 5 can accurately hold the root Fr of the femur F of the poultry leg meat M on the side of the knee joint K from both sides in the circumferential direction.

After setting the auxiliary clamp 5 to the clamp closed position, the controller 130 controls the auxiliary clamp 5 to be pulled up in synchronization with the ankle holding part 2 by the auxiliary actuator 38. For this reason, the load upon peeling off of the meat part Mp from the femur F can be distributed to the hanger 12 of the ankle holding part 2 and the clamp portions 43 of the auxiliary clamp 5. Accordingly, it is possible to prevent the femur F and the tibia T from being cut off by the load when the meat part Mp is peeling off. The auxiliary clamp 5 can reliably prevent the portion between the tibia T and the femur F from being stretched by the load when the meat part Mp is peeling off.

In the cutting off process, the round cutting edge cutter 68 (the round cutting edge main body 78) separates the meat part Mp from the femur F by moving toward the femur head Fh from the opposite side of the femur head Fh.

At the end portion E on the side of the femur head Fh, the poultry leg meat M is attached to the opposite side of the femur head Fh through the muscle. For this reason, by moving the round cutting edge cutter 68 (the round cutting edge main body 78) from the opposite side of the femur head Fh toward the femur head Fh, the muscle can be cut reliably. That is, for example, when the round cutting edge cutter 68 (the round cutting edge main body 78) is moved from the side of the femur head Fh to the opposite side of the femur head Fh, the muscle escapes to the outside, making it difficult to cut the muscle. For this reason, much remaining meat is remained on the side of the femur F to lower a deboning yield percentage. On the other hand, when the round cutting edge cutter 68 (the round cutting edge main body 78) is moved from the opposite side of the femur head Fh toward the femur head Fh, the femur F gets in the way and prevents the muscle from escaping, and the round cutting edge cutter 68 (the round cutting edge main body 78) can cut the muscle reliably. For this reason, the deboning yield percentage can be improved.

The cutter unit 6 includes the cutter holding part 67, the support part 66 configured to swingably support the cutter holding part 67, and the biasing part 69 configured to bias the cutter holding part 67. For this reason, even when the round cutting edge main body 78 hits the femur F, the round cutting edge main body 78 escapes from the femur F. For this reason, the impact on the round cutting edge main body 78 can be attenuated when it abuts the femur F. Accordingly, damage to the cutter unit 6 such as chipping of the cutting edge of the round cutting edge main body 78 can be suppressed.

When the round cutting edge main body 78 moves to a proper position with respect to the femur F, the round cutting edge main body 78 is elastically biased by the biasing part 69. For this reason, it is possible to prevent the round cutting edge main body 78 from swinging unnecessarily. Accordingly, the meat part Mp can be appropriately separated from the femur F.

The moving part 3 moves the ankle holding part 2. For this reason, a relative movement amount between the ankle holding part 2 and the separator 4 can be accurately controlled. A moving speed of the ankle holding part 2 can also be controlled. The measurement result from the leg meat measuring part 7 can also be properly reflected in the relative movement amount between the ankle holding part 2 and the separator 4. The operations of the ankle holding part 2 can be stabilized. For this reason, the deboning yield percentage can be further improved.

A method of performing separation has an ankle holding process, a measurement process, a separator sandwiching process, a moving process, and a cutting off process. In the moving process, movement amount of the separator 4 with respect to the femur F is determined on the basis of the measurement result by the measurement process. For this reason, accuracy of the position recognition of the end portion E on the side of the femur head Fh can be improved by the leg meat measuring part 7 and the controller 8. Accordingly, the deboning yield percentage can be improved, damage on the cutter unit 6 can be prevented, and assembly workability of the separation device 1 can be further improved.

In the cutting off process, while the meat part Mp is pulled from the femur head Fh toward the opposite side (lower side) of the knee joint K by the separator 4, the round cutting edge main body 78 passes directly under the end portion E on the side of the femur head Fh. Accordingly, the meat part Mp is separated from the femur F. For this reason, the meat part Mp can be cut off from the femur F by the round cutting edge main body 78 in a state in which a tension is applied to the meat part Mp. Accordingly, the round cutting edge main body 78 can cut the meat part Mp well. The remaining meat on the side of the femur F can be reduced as much as possible, and the deboning yield percentage can be further improved.

Variant

<Bone Pressing Pusher>

Next, a variant of the separation device 1 will be described with reference to FIG. 9.

Figure 9:
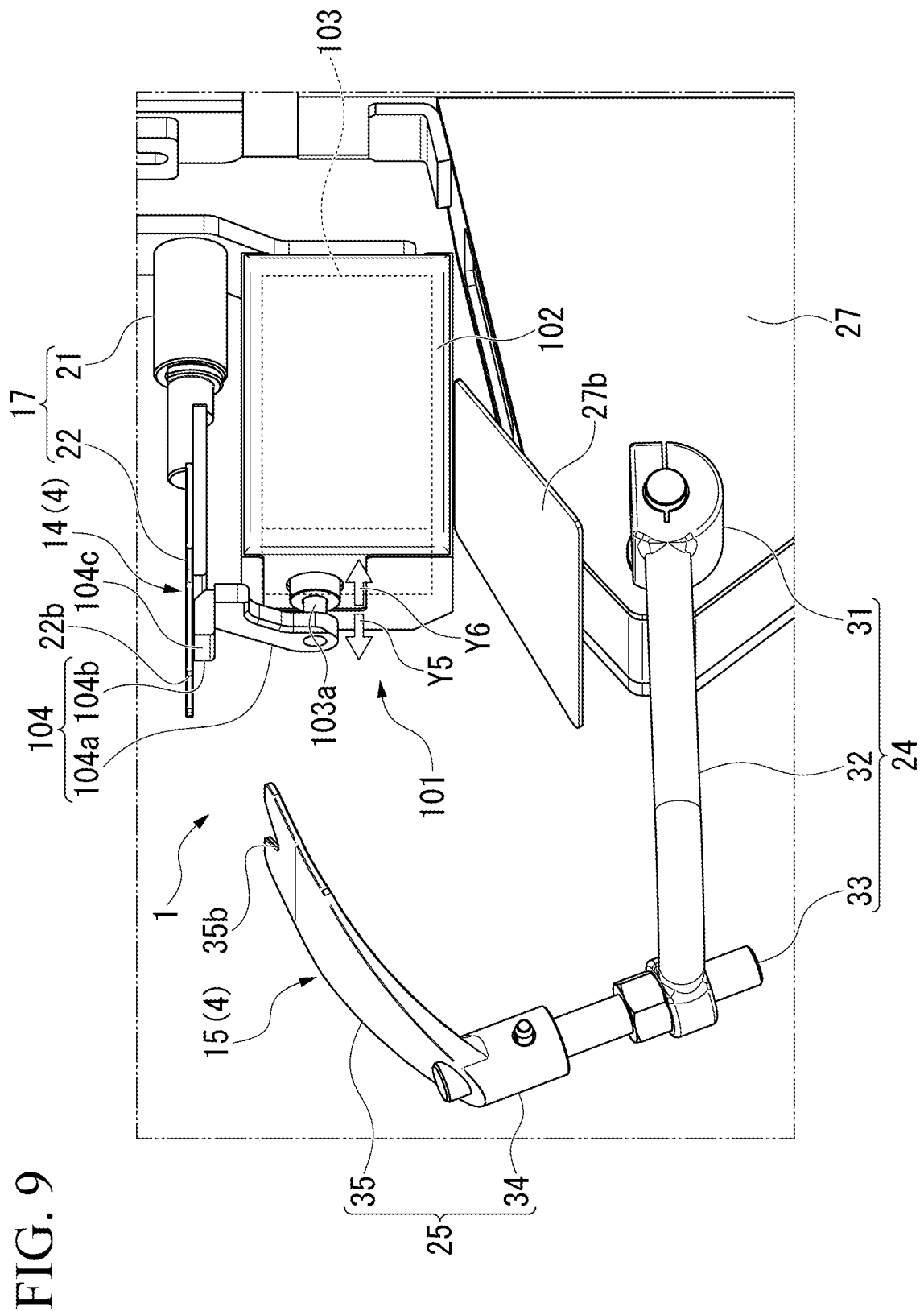
FIG. 9 is a partially enlarged perspective view of a separation device according to a variant of the present invention.

FIG. 9 is a partially enlarged perspective view showing the variant of the separation device 1.

As shown in FIG. 9, the separation device 1 may include a bone pressing pusher 101 disposed just below the support bar 16 and the fixed separator 17.

Incidentally, when the meat part Mp is peeled off the femur by the separator 4, there is a possibility that the end portion E on the side of the femur head Fh is caught on the fixed separator main body 22. For this reason, there is a possibility that the end portion on the side of the femur head Fh was damaged such as being scraped off by the separator 4. Here, the bone pressing pusher 101 is provided.

The bone pressing pusher 101 includes a waterproof case 102 fixed to the outer circumferential surface of the center column 114, a bone pressing actuator 103 accommodated in the waterproof case 102, and a pusher main body 104 attached to a tip of a rod 103a in the bone pressing actuator 103. The bone pressing pusher 101 presses the poultry leg meat M from the side of the fixed separator 17 toward the movable separator 25 immediately before the movable separator main body 35 rides on the femur head Fh during the moving process (details will be described below).

The rod 103a of the bone pressing actuator 103 protrudes outward from the waterproof case 102 via a rod insertion hole (not shown) formed in the waterproof case 102. The pusher main body 104 attached to the protruded tip is formed in an L shape when seen in the radial direction. That is, the pusher main body 104 is constituted by a base section 104a attached to the rod 103a, and an upper plate 104b formed integrally with the upper end of the base section 104a.

The upper plate 104b extends in the horizontal direction from the upper end of the base section 104a toward an outer side in the radial direction. The upper plate 104b is disposed just below the fixed separator main body 22 among the fixed separator 17. In other words, the upper plate 104b is disposed side by side with the fixed separator main body 22 in the upward/downward direction.

In the bone pressing pusher 101, in a state in which the pusher main body 104 is moved fully forward by the bone pressing actuator 103 (see an arrow Y5 in FIG. 9), a position of a tip surface 104c on an outer side of the upper plate 104b in the radial direction is set as follows. That is, when seen in the upward/downward direction, among the concave portion 22b (see also FIG. 1) of the fixed separator main body 22, the tip surface 104c of the upper plate 104b is positioned slightly outside than the most concave portion in the radial direction.

In the bone pressing pusher 101, in a state in which the pusher main body 104 is fully retracted by the bone pressing actuator 103 (see an arrow Y6 of FIG. 9), the position of the tip surface 104c of the upper plate 104b is set as follows. That is, when seen in the upward/downward direction, among the concave portion 22b of the fixed separator main body 22, the tip surface 104c of the upper plate 104b is positioned slightly inside than the most concave portion in the radial direction.

In the following description, in the bone pressing pusher 101, a position where the pusher main body 104 has fully advanced is referred to as an advanced position, and a position where the pusher main body 104 has fully retreated is referred to as a retreated position.

<Operations of Bone Pressing Pusher>

Next, operations of the bone pressing pusher 101 will be described.

At the beginning of the moving process, the bone pressing pusher 101 is at the retreated position. When the ankle holding part 2 and the auxiliary clamp 5 are pulled up, the meat part Mp is peeled off the femur by the separator 4. At the same time, the end portion E on the side of the femur head Fh is moved upward.

When the end portion E on the side of the femur head Fh is moved to the front surface of the tip surface 104c on the upper plate 104b of the pusher main body 104, the controller 130 moves the bone pressing pusher 101 to the advanced position at this timing. This timing is determined on the basis of the detection result of the leg meat measuring part 7. That is, in the controller 130, on the basis of the detection result of the leg meat measuring part 7, the pulling-up amount of the ankle holding part 2 is calculated when the end portion E on the side of the femur head Fh is positioned on the front surface of the tip surface 104c of the upper plate 104b. The timing for setting the bone pressing pusher 101 to the advanced position is determined on the basis of the calculation result.

In a state in which the bone pressing pusher 101 is at the advanced position, the end portion E on the side of the femur head Fh is slightly pushed from the side of the fixed separator 17 toward the movable separator 25 by the pusher main body 104. In this state, when the end portion E on the side of the femur head Fh passes through the fixed separator main body 22, it is possible to prevent the end portion E on the side of the femur head Fh from being caught in the concave portion 22b of the fixed separator main body 22.

On the other hand, the movable separator main body 35 is slightly separated from the fixed separator main body 22 by the load applied when the movable separator main body 35 rides on the femur head Fh. For this reason, even when the end portion E on the side of the femur head Fh is slightly pushed from the side of the fixed separator 17 toward the movable separator 25, it is possible to prevent the end portion E on the side of the femur head Fh from being caught in the concave portion 35b of the movable separator main body 35.

Accordingly, according to the above-mentioned variant, immediately before the fixed separator main body 22 or the movable separator main body 35 rides on the end portion E on the side of the femur head Fh, the end portion E can be slightly separated from the fixed separator main body 22. Accordingly, the fixed separator main body 22 can prevent the end portion E on the side of the femur head Fh from being scraped off. For this reason, it is possible to prevent bone flakes and the like from adhering to the meat part Mp cut off from the femur. Quality of the cut off meat part Mp can be improved.

In order to determine the timing at which the end portion E on the side of the femur head Fh moves to the front surface of the tip surface 104c on the upper plate 104b, the following configuration is adopted. That is, in the controller 130, on the basis of the detection result of the leg meat measuring part 7, the pulling-up amount of the ankle holding part 2 when the end portion E on the side of the femur head Fh is located on the front surface of the tip surface 104c in the upper plate 104b is calculated. According to the above-mentioned configuration, there is no need to provide a separate sensor for the bone pressing pusher 101. For this reason, manufacturing costs of the bone pressing pusher 101 can be reduced, and driving control of the bone pressing pusher 101 can be performed accurately.

In the above-mentioned variant, the case in which driving control of the bone pressing pusher 101 is performed on the basis of the detection result of the leg meat measuring part 7 has been described. However, there is no limitation thereto, and a sensor configured to detect whether the end portion E on the side of the femur head Fh is moved to the front surface of the tip surface 104c in the upper plate 104b may be provided.

The present invention is not limited to the above-mentioned embodiment, and various modifications may be added to the above-mentioned embodiment without departing from the scope of the present invention.

For example, the case in which the poultry leg meat M is hung by the ankle holding part 2 has been described in the above-mentioned embodiment. However, there is no limitation thereto, and the ankle holding part 2 may hold the ankle A of the poultry leg meat M. For example, the poultry leg meat M may be laid down on a work table (not shown). It may be configured to hold the ankle A of this placed poultry leg meat M. In this case, for example, the ankle holding part 2 may be configured to move in the horizontal direction according to the posture of the poultry leg meat M. The separator 4 may also be provided according to the posture of the poultry leg meat M.

The case in which the separator 4 is relatively moved to the end portion E on the side of the femur head Fh along the femur F by moving the ankle holding part 2 using the moving part 3 has been described in the above-mentioned embodiment. However, there is no limitation thereto, and the moving part 3 may move at least one of the ankle holding part 2 and the separator 4 to the other, and relatively move the separator 4 until the end portion E on the side of the femur head Fh along the femur F.

The case in which the biasing part 69 includes the tension spring 85 has been described in the above-mentioned embodiment. The case in which the cutter holding part 67 is elastically biased toward the ankle holding part 2 by the tension spring 85 has been described. However, there is no limitation thereto, and a member configured to elastically bias the cutter holding part 67 toward the ankle holding part 2 may be provided as a biasing part. For example, rubber, sponge, or the like, may be used instead of the tension spring 85.

The case in which the separator 4 pinches the femur F of the poultry leg meat M from both sides in the radial direction has been described in the above-mentioned embodiment. The case in which the separator 4 sandwiches the femur F by moving the movable separator main body 35 with respect to the fixed separator main body 22 has been described. However, there is no limitation thereto, and the separator 4 may be configured to sandwich the femur F in a direction crossing the extension direction of the femur F in between the side of the knee joint K of the femur F and the meat part Mp. For example, the separator 4 may sandwich the femur F from both sides in the circumferential direction. The separator 4 may be constituted by the two movable separator main bodies 35 (the movable parts 15).

In the above-mentioned embodiment, the case in which the leg meat measuring part 7 performs measurement of the poultry leg meat M from a part closer to the ankle holding part 2 than the knee joint K until the cutting part D of the femur F on the side of the hip joint has been described. However, there is no limitation thereto, and the leg meat measuring part 7 may perform measurement of the poultry leg meat M at least from a part closer to the ankle holding part 2 than the knee joint K until the cutting part D of the femur F on the side of the hip joint. For example, the entire poultry leg meat M below the ankle A may be measured by the leg meat measuring part 7.

INDUSTRIAL APPLICABILITY

According to the above-mentioned poultry leg meat deboning device, it is possible to reduce possibility of cutting the end portion on the side of the femur head by the cutter. For this reason, it is possible to suppress chipping of the cutter cutting edge and occurrence of failure of the poultry leg meat deboning device. There is no need to adjust an assembly position of the separator to match the poultry leg meat. For this reason, it is possible to improve assembly workability of the poultry leg meat deboning device. Since the meat part can be separated from the femur while reducing the remaining meat on the side of the femur, the deboning yield percentage can be improved.

REFERENCE SIGNS LIST

1 Separation device (poultry leg meat deboning device)
2 Ankle holding part
3 Moving part
4 Separator
5 Auxiliary clamp
6 Cutter unit
7 Leg meat measuring part
66 Support part
67 Cutter holding part
68 Round cutting edge cutter (cutter)
69 Biasing part
78 Round cutting edge main body (cutter)
101 Bone pressing pusher
104 Pusher main body
110 Automatic deboning device (poultry leg meat deboning device)
130 Controller
A Ankle
D Cutting part
E End portion
F Femur
Fh Femur head
Fr Root
T Tibia

The invention claimed is:

1. A poultry leg meat deboning device configured to perform a separation of a meat part from a femur with respect to a poultry leg meat to which a peeling off of the meat part has been performed until a side of a knee joint of the femur in a bone-in poultry leg meat which has been cut from a femur of a poultry carcass, the poultry leg meat deboning device comprising:
    an ankle holding part configured to hold an ankle of the poultry leg meat;
    a leg meat measuring part configured to measure between at least a part of the poultry leg meat closer to the ankle holding part than the knee joint and a cutting part of the poultry leg meat on a side of a hip joint of the poultry leg meat, at a side closer to the femur than the ankle holding part in a state before the peeling off of the meat part of the poultry leg meat has been performed;
    a separator configured to sandwich the femur from a direction crossing an extension direction of the femur in between the side of the knee joint of the femur and the meat part;
    a moving part configured to move at least one of the ankle holding part and the separator so that one of the ankle holding part and the separator separates with respect to the other one of the ankle holding part and the separator while maintaining a state in which the separator is sandwiching and configured to relatively move the separator until an end portion of the femur on the side of the hip joint along the femur;
    a controller configured to determine movement amount of the separator with respect to the femur by the moving part on the basis of a measurement result by the leg meat measuring part; and
    a cutter configured to cut off the meat part from the femur at the end portion of the femur.

2. The poultry leg meat deboning device according to claim 1, wherein
    the ankle holding part hangs the poultry leg meat, and
    the moving part moves the separator downward with respect to the femur.

3. The poultry leg meat deboning device according to claim 1, wherein the moving part moves the separator with respect to the femur by moving only the ankle holding part with respect to the separator.

4. The poultry leg meat deboning device according to claim 1, further comprising an auxiliary clamp configured to hold a root of the femur of the poultry leg meat on the side of the knee joint without changing a relative position with respect to the root.

5. The poultry leg meat deboning device according to claim 4, wherein the controller moves the auxiliary clamp in synchronization with the ankle holding part.

6. The poultry leg meat deboning device according to claim 1, wherein
    the cutter is movably held in the direction crossing the extension direction of the femur, and
    the cutter moves from a side of the femur opposite to a femur head toward the femur head and cuts off the meat part from the femur.

7. The poultry leg meat deboning device according to claim 1, wherein
    the separator comprises:
        a fixed separator; and
        a movable separator provided to be able to approach and separate from the fixed separator,
    the movable separator is provided to be separable from the fixed separator due to a load applied when the movable separator rides on the end portion of the femur,
    a bone pressing pusher having a pusher main body configured to push the poultry leg meat from a side closer to the fixed separator toward the movable separator is provided,
    the pusher main body is disposed in parallel with the fixed separator on a side of the fixed separator opposite to the ankle holding part, and
    the bone pressing pusher pushes the pusher main body toward the movable separator at a timing when the end portion of the femur is moved to a front surface of the pusher main body.

8. The poultry leg meat deboning device according to claim 7, wherein
the controller calculates a timing when the end portion of the femur moves to the front surface of the pusher main body on the basis of the measurement result of the leg meat measuring part, and
the bone pressing pusher pushes the pusher main body on the basis of the calculation result of the controller.

9. A poultry leg meat deboning method of performing a separation of a meat part from a femur with respect to a poultry leg meat to which a peeling off of the meat part has been performed until a side of a knee joint of the femur in a bone-in poultry leg meat which has been cut from a femur of a poultry carcass, the poultry leg meat deboning method comprising:
an ankle holding process of holding an ankle of the poultry leg meat using an ankle holding part;
a measurement process of measuring between at least a part of the poultry leg meat closer to the ankle holding part than the knee joint and a cutting part of the poultry leg meat on a side of a hip joint of the poultry leg meat, at a side closer to the femur than the ankle holding part in a state before the peeling off of the meat part of the poultry leg meat has been performed;
a separator sandwiching process of sandwiching the femur with a separator from a direction crossing an extension direction of the femur in between the side of the knee joint of the femur and the meat part;
a moving process of moving at least one of the ankle holding part and the separator so that one of the ankle holding part and the separator separates with respect to the other one of the ankle holding part and the separator while maintaining a state in which the separator is sandwiching and relatively moving the separator until an end portion of the femur on the side of a hip joint along the femur; and
a cutting off process of cutting off the meat part from the femur at the end portion of the femur using a cutter after the moving process, wherein
in the moving process, movement amount of the separator with respect to the femur is determined on the basis of a measurement result from the measurement process.

10. The poultry leg meat deboning method according to claim 9, wherein
in the ankle holding process, the poultry leg meat is hung, and
in the moving process, the separator is moved to the end portion of the femur along the femur by pulling up the ankle holding part.

11. The poultry leg meat deboning method according to claim 10, further comprising
an auxiliary clamp configured to hold a root of the femur of the poultry leg meat on the side of the knee joint without changing a relative position with respect to the root, wherein
in the moving process, the auxiliary clamp is moved in synchronization with the ankle holding part when the auxiliary clamp is moved.

12. The poultry leg meat deboning method according to claim 9, wherein, in the separating process, the meat part is cut off in a state in which the meat part is pulled from the femur on the side of a femur head toward an opposite side of the knee joint by the separator.

13. The poultry leg meat deboning method according to claim 9, wherein
the separator comprises:
a fixed separator; and
a movable separator provided to be able to approach and separate from the fixed separator,
the movable separator is provided to be separable from the fixed separator due to a load applied when the movable separator rides on the end portion of the femur, and
the moving process has a pushing process of pushing the end portion of the femur from a side closer to the fixed separator toward the movable separator immediately before the end portion of the femur passes through the separator.

* * * * *